(12) United States Patent
Asayama et al.

(10) Patent No.: US 8,310,603 B2
(45) Date of Patent: Nov. 13, 2012

(54) DEVICE LINKAGE APPARATUS

(75) Inventors: Sako Asayama, Nara (JP); Keisuke Matsuo, Nara (JP)

(73) Assignee: Panasonic Corporation, Osaka (JP)

( * ) Notice: Subject to any disclaimer, the term of this patent is extended or adjusted under 35 U.S.C. 154(b) by 1171 days.

(21) Appl. No.: 12/097,918

(22) PCT Filed: Dec. 19, 2006

(86) PCT No.: PCT/JP2006/325219
§ 371 (c)(1),
(2), (4) Date: Jun. 18, 2008

(87) PCT Pub. No.: WO2007/072791
PCT Pub. Date: Jun. 28, 2007

(65) Prior Publication Data
US 2009/0290065 A1 Nov. 26, 2009

(30) Foreign Application Priority Data
Dec. 20, 2005 (JP) ................................ 2005-367002

(51) Int. Cl.
H04N 5/16 (2006.01)
(52) U.S. Cl. ...................................................... 348/738
(58) Field of Classification Search .................. 348/553, 348/705, 725, 730, 735, 738, 704; 725/39, 725/44, 100
See application file for complete search history.

(56) References Cited

U.S. PATENT DOCUMENTS
7,468,755 B2 * 12/2008 Ando ............................ 348/553
8,089,565 B2 * 1/2012 Takahashi et al. ............. 348/730
2002/0066099 A1 * 5/2002 Ohno ............................ 725/39
2003/0149492 A1 * 8/2003 Munezane ........................ 700/12
2006/0095596 A1 * 5/2006 Yung et al. ........................ 710/5
2007/0176786 A1 * 8/2007 Yamamoto ................ 340/825.22

FOREIGN PATENT DOCUMENTS
| JP | 5-153520 | 6/1993 |
| JP | 6-133238 | 5/1994 |
| JP | 2001-111970 | 4/2001 |
| JP | 2001-257964 | 9/2001 |
| JP | 2002-314447 | 10/2002 |

(Continued)

OTHER PUBLICATIONS

Full English translation of JP 2005-094072, Apr. 2005.

(Continued)

Primary Examiner — Nasser Goodarzi
Assistant Examiner — An Nguyen
(74) Attorney, Agent, or Firm — Wenderoth, Lind & Ponack L.L.P.

(57) ABSTRACT

A device linkage apparatus, which reduces the operating load on a user and causes a television and an amplifier to be appropriately linked, includes: a correspondence table storage unit in which is stored a mode correspondence table indicating, for each TV-program genre, the audio output mode corresponding to the genre; an attribute obtainment unit which obtains the genre of a TV-program to be reproduced; a mode identification unit which identifies, from among the audio output modes indicated in the mode correspondence table, the audio output mode that corresponds to the genre obtained by the attribute obtainment unit; and a linkage execution unit which causes the operations of a television and an amplifier to be linked accordance to the audio output mode identified by the mode identification unit.

4 Claims, 19 Drawing Sheets

FOREIGN PATENT DOCUMENTS

| | | |
|---|---|---|
| JP | 2002-374474 | 12/2002 |
| JP | 2003-298975 | 10/2003 |
| JP | 2005-020624 | 1/2005 |
| JP | 2005-094072 | 4/2005 |
| JP | 2005-524926 | 8/2005 |
| JP | 2005-244476 | 9/2005 |
| JP | 2006-101391 | 4/2006 |
| WO | 03-096695 | 11/2003 |

OTHER PUBLICATIONS

Full English translation of JP 2001-257964, Sep. 2001.
Full English translation of JP 2002-314447, Oct. 2002.
Full English translation of JP 2001-111970, Apr. 2001.
English translation of Par. Nos. [0018], [0019], [0025], [0088]-[0090] and Figs. 1 and 3-12 of JP 2005-094072, Apr. 2005.
International Search Report issued Apr. 17, 2007 in the International (PCT) Application of which the present application is the U.S. National Stage.
High-Definition Multimedia Interface Specification Version 1.2, Hitachi et al., (see especially p. CEC-23 of 84 to p. CEC-84 of 84), Aug. 22, 2005.
High-Definition Multimedia Interface, HDMI Licensing, LLC, Dec. 14, 2005, Specification Version 1.2a, p. CEC-28 of 62-p. CEC-29 of 62, http://www.hdmi.org/download/HMDI_Specification_1.2a.pdf.

* cited by examiner

FIG. 8

| | 701 | 702 | 703 | 704 | 705 | 706 |
|---|---|---|---|---|---|---|
| 711 | 1 | News 9 | 9:00 | 10:30 | Mono | |
| 712 | 1 | Movie AAA | 10:30 | 12:00 | Stereo | Movie |
| 713 | 2 | Movie BBB | 9:00 | 11:00 | 5.1 | Movie |
| 714 | 2 | Soccer | 11:00 | 12:00 | Mono | Spo |

FIG. 15

| | 701 | 702 | 703 | 704 | 705 | 706 | 721 |
|---|---|---|---|---|---|---|---|
| 711 | 1 | News 9 | 9:00 | 10:30 | Mono | | Television |
| 712 | 1 | Movie AAA | 10:30 | 12:00 | Stereo | Movie | Theater |
| 713 | 2 | Movie BBB | 9:00 | 11:00 | 5.1 | Movie | Theater |
| 714 | 2 | Soccer | 11:00 | 12:00 | Mono | Spo | Theater |

DEVICE LINKAGE APPARATUS

TECHNICAL FIELD

The present invention relates to a device linkage apparatus which controls linkage of devices such as a television and an amplifier.

BACKGROUND ART

Recent years, there has been a full-fledged proliferation, in households, of home theater systems that combine a set top box (hereafter called STB) which receives a digital broadcast or a cable television (hereafter called CATV) broadcast, a television, a speaker, and a Digital Versatile Disk (DVD) player. With these devices, it is possible to implement the reproduction of multi-channel audio, for example 5.1 channel audio, by setting the respective devices with the use of a remote control (see Non-Patent Reference 1).

There is proposed a technique (device linkage apparatus) for switching between outputting audio only from a television reception apparatus and outputting the audio from a speaker connected to an amplifier, in linkage with the ON/OFF operation of the power switch of the amplifier (see for example Patent Reference 1).

For example, the device linkage apparatus in the aforementioned Patent Reference 1 is included in an AV amplifier that is capable of configuring a surround system by being combined with a television reception apparatus. In other words, the device linkage apparatus in the aforementioned Patent Reference 1 can perform switching between the use of the surround system and the individual use of the television reception apparatus.

FIG. 1 shows a block diagram of the AV amplifier in the aforementioned Patent Reference 1.

With such an device linkage apparatus in an AV amplifier 40, when a power switch 41 of the AV amplifier 40 is turned ON during use of the surround system, a change-over switch 50 is switched to a center audio amplification circuit 48. As a result, an audio signal supplied to an audio input terminal 43 from a reproduction device such as a Video Tape Recorder (VTR) or a Laser Disc (LD), for example, or a television reception apparatus connected to the AV amplifier 40 is supplied to surrounding speakers, via a DSP 45 and through an audio output terminal 49.

With such a device linkage apparatus in the AV amplifier 40, when the power switch 41 of the AV amplifier 40 is turned OFF during independent use of the television reception apparatus, the change-over switch 50 is switched to a television audio input terminal 51. As a result, television audio processed in the amplification circuit of the television reception apparatus is supplied to a speaker of the television reception apparatus, via the AV amplifier 40.

Non-Patent Reference 1: High Definition Multimedia Interface specification Version 1.2
Patent Reference 1: Japanese Unexamined Patent Application Publication No. 5-153520

SUMMARY OF THE INVENTION

Problems that Invention is to Solve

However, with the device linkage apparatus in Patent Reference 1, there is the problem of having to take the trouble of operating the power to the AV amplifier in order to switch between the use and non-use of the surround system. In other words, a user needs to turn ON the power to the AV amplifier 40 when causing a speaker connected to the AV amplifier 40 to output audio, and needs to turn OFF the power to the AV amplifier 40 when causing a speaker included in the television reception apparatus to output the audio, other than the speaker connected to the AV amplifier.

Thus, the present invention is conceived in view of the aforementioned problem and has as an object to provide a device linkage apparatus which reduces the operating load of the user and causes devices to be linked appropriately.

Means to Solve the Problems

In order to achieve the aforementioned object, the device linkage apparatus according to the present invention is a device linkage apparatus which causes operations of devices used in reproducing a content to be linked with each other, the device linkage apparatus comprising: a correspondence table storage unit in which a mode correspondence table is stored, the mode correspondence table indicating, for each content attribute, a mode corresponding to the attribute; an attribute obtainment unit which obtains an attribute of a content to be reproduced; a mode identification unit which identifies, from among the modes indicated in the mode correspondence table, a mode corresponding to the attribute obtained by the attribute obtainment unit; a mode acceptance unit which accepts a mode according to an operation by a user; a linkage execution unit which causes the operations of the devices to be linked according to the mode identified by the mode identification unit and the mode accepted by the mode acceptance unit, and causes the devices to reproduce the content to be reproduced, by transmitting a High Definition Multimedia Interface (HDMI)-Consumer Electronics Control (CEC)-based command to the devices; and a checking unit which checks: a power source state set for each of the devices; a mode in which each of the devices is currently operating; and a fact that the devices have received the command transmitted by the linkage execution unit, wherein the linkage execution unit: turns ON the power source of a device by transmitting the command to the device, upon judging, based on the check by the checking unit, that the power source of the device is OFF; prohibits the transmission of the command, upon judging, based on the check by the checking unit, that the respective modes in which the devices are currently operating match the mode identified by the mode identification unit or the mode accepted by the mode acceptance unit; and transmits the command again to a device, upon judging that the checking unit is unable to check, within a predetermined period, the fact that the device has received the command.

Furthermore, in order to achieve the aforementioned object, the device linkage apparatus according to the present invention is a device linkage apparatus which causes operations of devices used in reproducing a content to be linked with each other, the device linkage apparatus includes: a correspondence table storage unit in which a mode correspondence table is stored, the mode correspondence table indicating, for each content attribute, a mode corresponding to the attribute; an attribute obtainment unit which obtains an attribute of a content to be reproduced; a mode identification unit which identifies, from among the modes indicated in the mode correspondence table, a mode corresponding to the attribute obtained by the attribute obtainment unit; and a linkage execution unit which causes the operations of the devices to be linked according to the mode identified by the mode identification unit, so as to cause the devices to reproduce the content to be reproduced. For example, the devices each include a first device and a second device which output audio, and the linkage execution unit: causes operations of the first device and the second device to be linked so that the second device suppresses audio output and the first device outputs audio, when the mode identification unit identifies a first mode; and causes operations of the first device and the second device to be linked so that the first device suppresses audio output and the second device outputs audio, when the mode identification unit identifies a second mode.

Accordingly, since the mode corresponding to the attribute of the content to be reproduced is identified and the operations of the devices are linked according to the mode, the content to be reproduced can be appropriately reproduced using the devices, without the user having to go through the trouble of carrying out setting operations on each of the devices. For example, the device for outputting the audio can be switched according to the attribute of the content to be reproduced, without the user carrying out setting operations. In this manner, with the device linkage apparatus according to the present invention, it is possible to reduce the operating load of the user and cause devices to be linked appropriately.

Furthermore, it is also possible that: the first device outputs video and audio of the content, the linkage execution unit: causes operations of the first device and the second device to be linked so that the second device suppresses audio output and the first device outputs video and audio, when the mode identification unit identifies the first mode; and causes operations of the first device and the second device to be linked so that the first device suppresses audio output and outputs video and the second device outputs audio, when the mode identification unit identifies the second mode. For example, the attribute is one of a genre and a channel of a content to be broadcast.

For example, the first device is a television, the second device is an amplifier, the first mode is a television mode, and the second mode is a theater mode. Furthermore, in the mode correspondence table, the television mode or the theater mode is associated with each genre or channel, and the mode identification unit identifies the mode, that is, the television mode or the theater mode, associated with the genre or channel obtained by the attribute obtainment unit. Then, when the identified mode is the television mode, the linkage execution unit causes the audio output from the speakers by the amplifier to be terminated, and causes the audio to be outputted from the television. On the other hand, when the identified mode is the theater mode, the linkage execution unit causes the audio output from the television to be terminated, and causes the audio to be outputted from the speakers by the amplifier. As a result, the user can easily switch between the television mode and the theater mode according to the genre or channel of the content to be reproduced, without carrying out setting operations on the television and amplifier.

Furthermore, it is also possible that the linkage execution unit causes the operation of the devices to be linked with each other so as to adjust audio quality of the audio to be outputted by the devices.

Accordingly, the user can appropriately switch audio quality and acoustic field according to the attribute of the content to be reproduced, without carrying out setting operations on the devices such as a television and amplifier, for example.

Furthermore, it is also possible that the linkage execution unit further adjusts picture quality of the video to be outputted by the first device, according to the mode identified by the mode identification unit.

Accordingly, the user can appropriately switch the picture quality according to the attribute of the content to be reproduced, without carrying out setting operations on the devices such as a television and amplifier, for example.

Note that the present invention can be implemented not only as such a device linkage apparatus, but also as a method and program thereof, a recording medium on which the program is stored, and an integrated circuit.

Effects of the Invention

The device linkage apparatus in the present invention produces the effect of reducing the operating load of a user and causing devices to be linked appropriately.

BRIEF DESCRIPTION OF DRAWINGS

FIG. 8 is a diagram showing an example of TV-program information display data stored in a second memory according to the embodiment of the present invention.

FIG. 15 is a diagram showing an example of TV-program information display data according to a second modification of the embodiment of the present invention.

NUMERICAL REFERENCES

Figure 1:
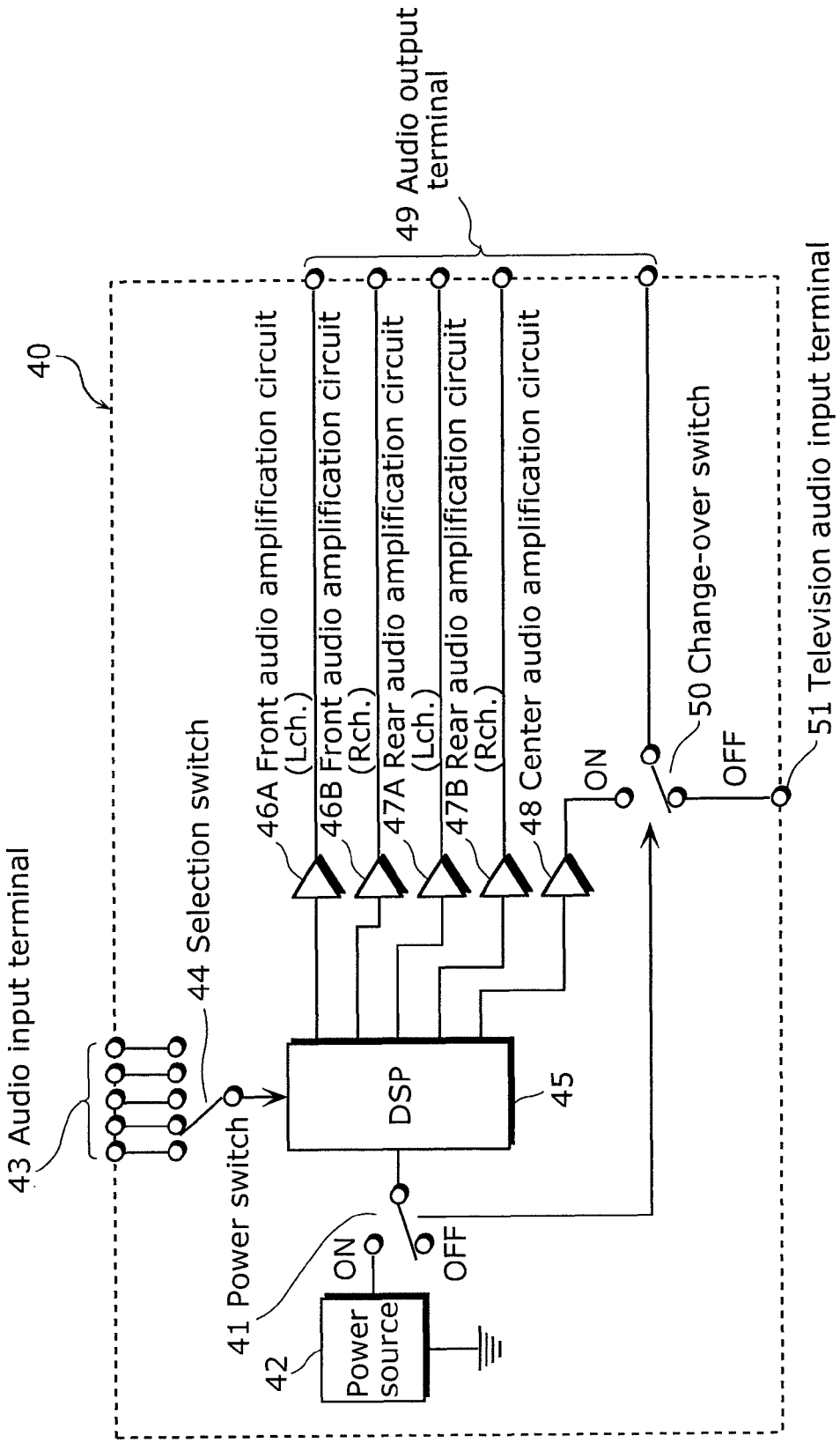
FIG. 1 is a configuration diagram of a conventional AV amplifier.

1 Television
2 Amplifier
3 Speaker
4 STB
100 Device linkage apparatus
201 Memory
202 Remote control reception unit
203 Microcomputer
204 HDMI-CEC communication unit
205 Tuner
206 Decoder
207 Display
208 Speaker
301 HDMI-CEC communication unit
302 Microcomputer
303 HDMI-CEC communication unit
304 Selector
305 External input unit
306 Speaker output unit
401 Remote control reception unit
402 First memory
403 Second memory
404 Receiving unit
405 Demultiplex unit
406 Descrambler
407 TS decoder
408 Video output unit
409 Audio output unit
410 HDMI-CEC communication unit
411 Microcomputer
412 EPG control unit
413 Device control unit
413a Attribute obtainment unit
413b Mode identification unit
413c Linkage execution unit
414 Correspondence table storage unit
414a Mode correspondence table

DETAILED DESCRIPTION OF THE INVENTION

Hereinafter, a device linkage apparatus according to the embodiment of the present invention shall be described with reference to the Drawings.

Figure 2A:
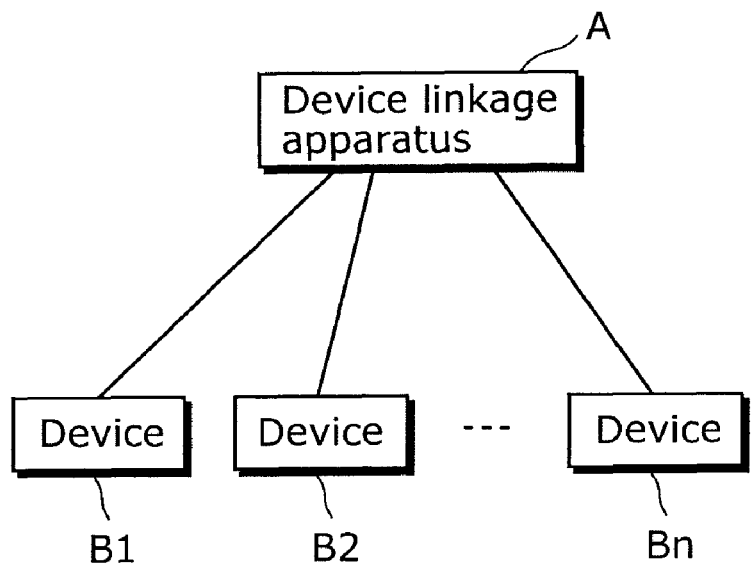
FIG. 2A is a configuration diagram showing the configuration of a system including a device linkage apparatus according to the embodiment of the present invention.

FIG. 2A is a configuration diagram showing the configuration of a system including the device linkage apparatus in the present embodiment.

The system includes a device linkage apparatus A in the present embodiment and n devices B1, B2, . . . , Bn. The device linkage apparatus A reduces the operating load of the user and causes the operations of the devices B1, B2, . . . , Bn to be linked appropriately. In other words, through the control of the devices B1, B2, . . . , Bn by the device linkage apparatus A in the present embodiment, the devices B1, B2, . . . , Bn execute linked processing.

For example, the device linkage apparatus A in the present embodiment is included in a set top box (hereafter called STB), and causes each of the STB, a television, an amplifier, and a speaker to be linked as the aforementioned devices. A home theater system is configured from such an STB, television, amplifier, and speaker.

Figure 2B:
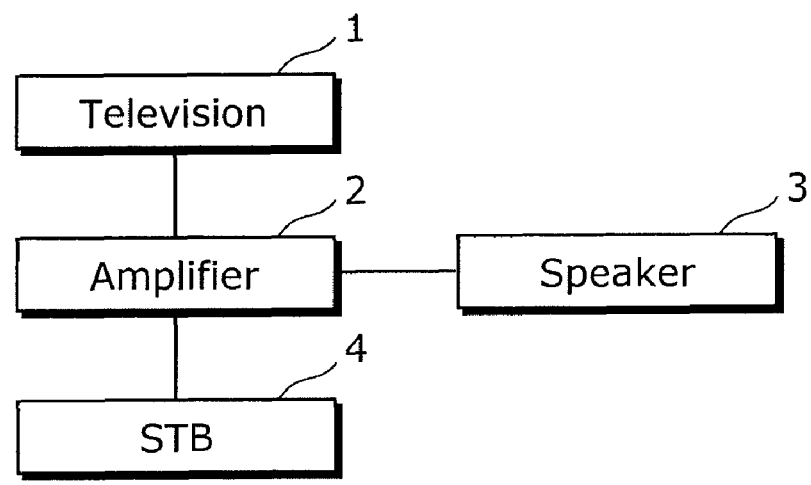
FIG. 2B is a configuration diagram of a home theater system according to the embodiment of the present invention.

FIG. 2B is a configuration diagram showing the configuration of a home theater system according to the present embodiment.

As shown in FIG. 2B, the home theater system includes a television 1, an amplifier 2, a speaker 3, and an STB 4.

The STB 4, the television 1, and the amplifier 2 in the present embodiment hold an High Definition Multimedia Interface (HDMI)-Consumer Electronics Control (CEC) communication unit which transmits and receives an HDMI-CEC command, and, by using an HDMI-CEC message which is the command, automatically switch between audio output modes such as a theater mode and a television mode, for example, according to the content to be reproduced.

Note that details of the HDMI specification is described in High Definition Multimedia Interface specification Version 1.2, and the HDMI-CEC specification is defined in the appendix "supplemental 1 Consumer Electronics Control" of the same specification. The HDMI standard is a transmission standard for transmitting non-compressed digital data of video/audio between devices, and a single cable complying with the HDMI standard is used in the transmission. HDMI-CEC defines a specification for bi-directionally transmitting a device control command between devices via such cable (HDMI cable). As of November 2005, the HDMI specification can be obtained through downloading from www.hdmi.org.

The television 1 holds an HDMI input terminal and is connected to the amplifier 2 through an HDMI cable. The television 1 can reproduce video/audio transmitted from the amplifier 2. Furthermore, the television 1 can receive an HDMI-CEC command transmitted through the HDMI cable, and perform processing corresponding to the received command.

The amplifier 2 holds an HDMI output terminal and an HDMI input terminal, and is connected to the television 1 and the STB 4 through the HDMI cable. Furthermore, the amplifier 2 is connected to the speaker 3 through a cable for the speaker. The amplifier 2 receives video/audio from the STB 4. The amplifier 2 transmits the received video to the television 1 and the received audio to the television 1 or the speaker 3. The amplifier 2 can receive an HDMI-CEC command transmitted through the HDMI cable, and perform processing corresponding to the command.

The speaker 3 is an assembly of speakers which perform multi-channel audio reproduction, for example, 5.1 channel reproduction, in order to reproduce an acoustic effect having a sense of realism as in a movie theater. The speaker 3, in actuality, is configured of 6 speakers (not illustrated). In other words, the speaker 3 includes a bass output speaker, and 5 speakers arranged in a frontal, a right-front direction, a left-front direction, a right-rear direction, and a left-rear direction, with respect to the user. The speaker 3 receives an audio signal from the amplifier 2, and outputs audio.

The STB 4 performs the receiving/reproduction of a television broadcast. Furthermore, the STB 4 holds an HDMI output terminal for outputting the reproduced video and audio.

Note that, in the present embodiment, an audio output mode in which audio is outputted from the speaker 3 connected to the amplifier 2 is called theater mode, and an audio output mode in which audio is outputted from a speaker built-into the television 1 is called television mode.

Figure 3:
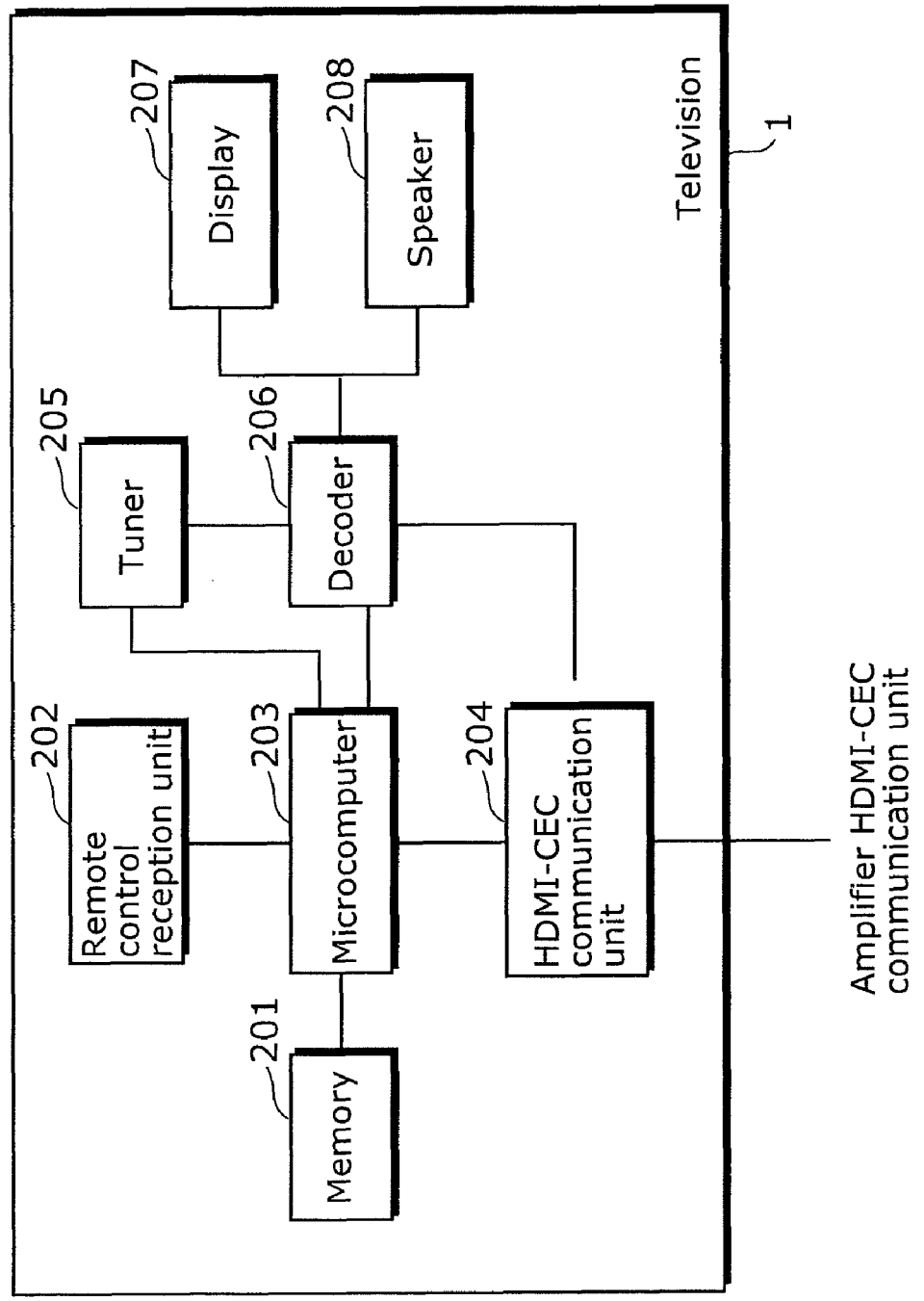
FIG. 3 is a configuration diagram of a television according to the embodiment of the present invention.

FIG. 3 is a configuration diagram showing the configuration of the television 1.

As shown in FIG. 3, the television 1 includes a memory 201, a remote control reception unit 202, a microcomputer 203, an HDMI-CEC communication unit 204, a tuner 205, a decoder 206, a display 207, and a speaker 208.

The television 1 can be operated by the user directly or with the use of a remote control device (not illustrated) (hereafter called television remote control).

When the remote control reception unit 202 receives a command sent from the television remote control, the microcomputer 203 performs processing according to the command, and controls the channel selection switching by the tuner 205 and the processing by the decoder 206. The decoder 206 outputs the video and audio signals inputted from the tuner 205 and the HDMI-CEC communication unit 204, to the display 207 and the speaker 208 according to the instruction by the microcomputer 203. Furthermore, the microcomputer 203 performs respective settings and control according to an HDMI-CEC command inputted from the HDMI-CEC communication unit 204.

Furthermore, the television 1 includes, in a front panel and the like, an input unit (not illustrated) having buttons and so on. With the input from the input unit, the television 1 accepts operations that are the same as the operations when the television remote control is used.

Figure 4:
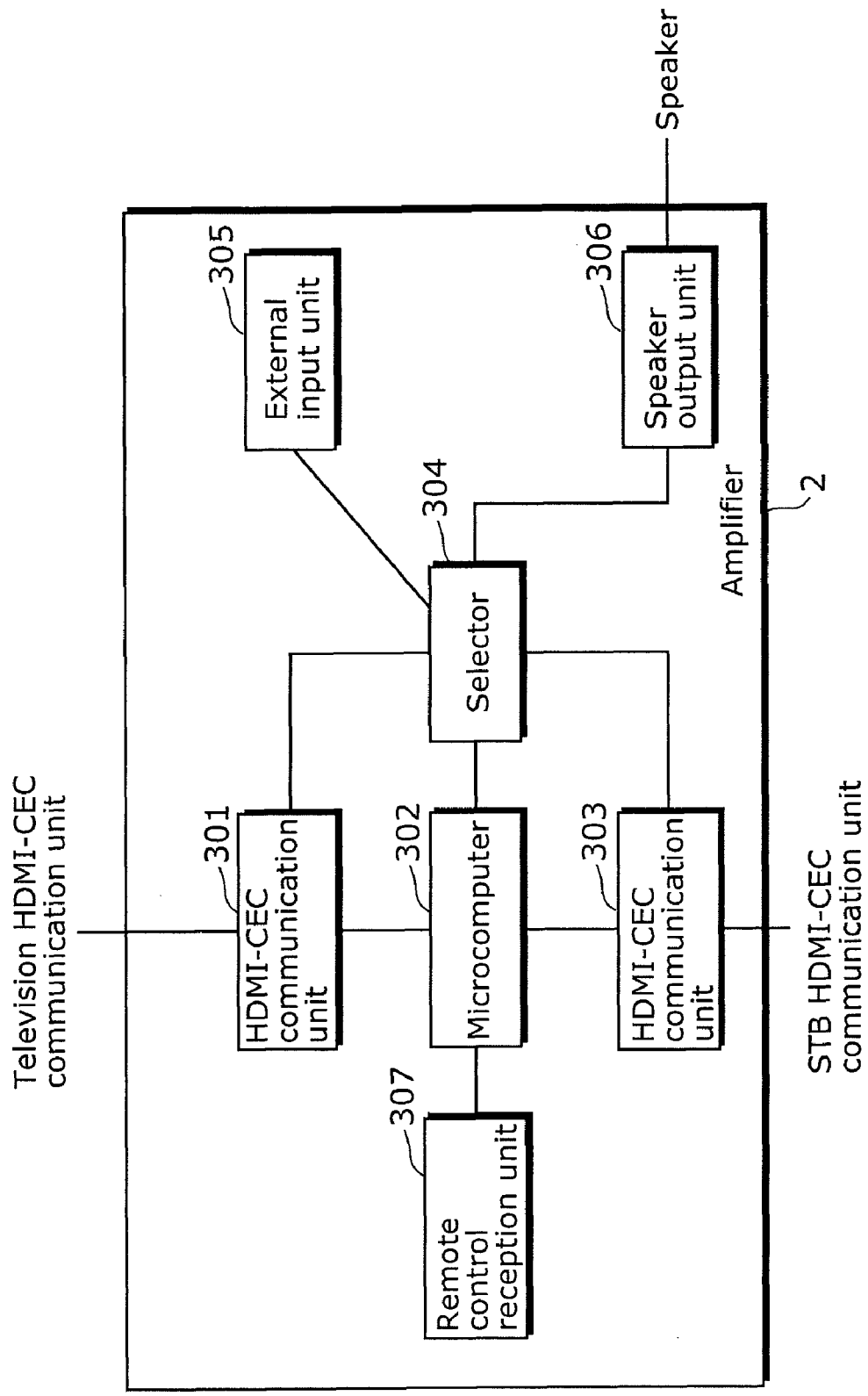
FIG. 4 is a configuration diagram of an amplifier according to the embodiment of the present invention.

FIG. 4 is a configuration diagram showing the configuration of the amplifier 2.

As shown in FIG. 4, the amplifier 2 includes an HDMI-CEC communication unit 301, a microcomputer 302, an HDMI-CEC communication unit 303, a selector 304, an external input unit 305, a speaker output unit 306, and a remote control reception unit 307.

The amplifier 2 can be operated by the user directly or with the use of a remote control device (not illustrated) (hereafter called amplifier remote control).

When the remote control reception unit 307 receives a command sent from the amplifier remote control, the microcomputer 302 performs processing according to the command. Furthermore, the microcomputer 302 performs processing according to an HDMI-CEC command received by the HDMI-CEC communication unit 301 or the HDMI-CEC communication unit 303.

In accordance with the instruction from the microcomputer 302, the selector 304 switches between an audio signal to be outputted from the external input unit 305 and an audio signal to be outputted from the HDMI-CEC communication unit 302, and outputs the audio signal that has been switched to, to the speaker output unit 306. Here, the selector 304 outputs the audio signal to the speaker 3 in a form that conforms to the format (stereo audio format, 5.1 channel audio format, and so on) of the audio signal.

Furthermore, the amplifier 2 includes, in a front panel and the like, an input unit (not illustrated) having buttons, and so on. With the input from the input unit, the amplifier 2 accepts operations that are the same as the operations when the amplifier remote control is used.

Figure 5A:
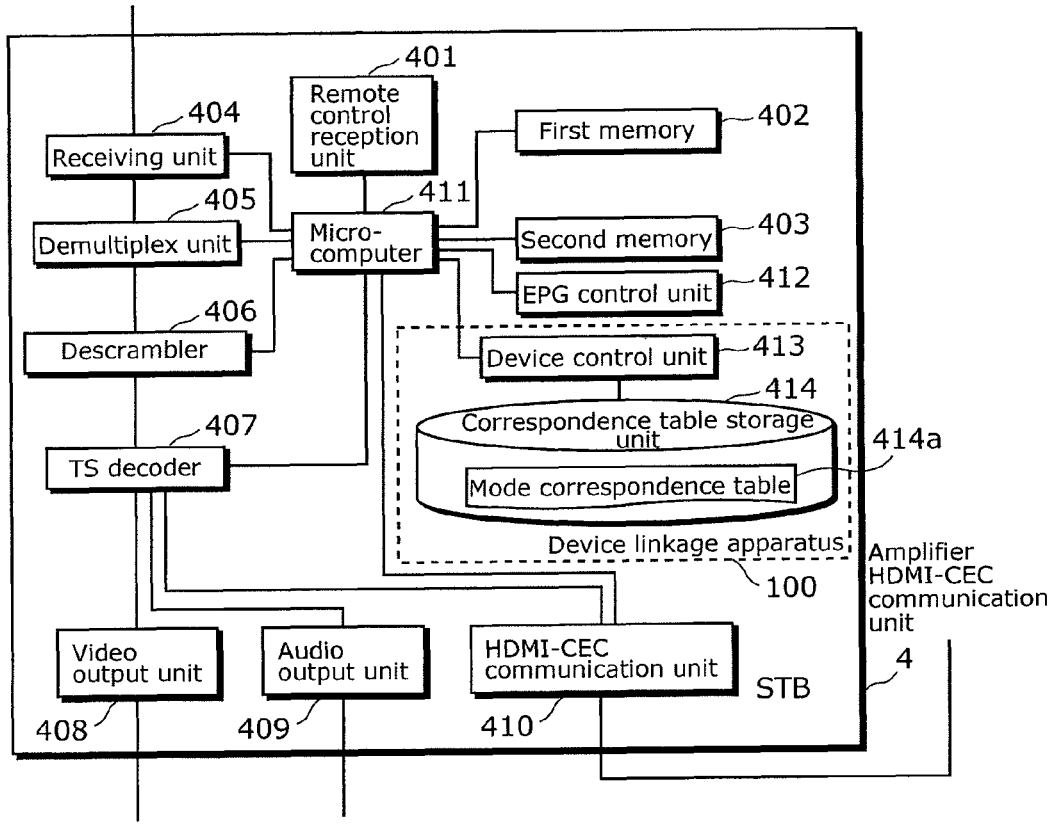
FIG. 5A is a configuration diagram of an STB according to the embodiment of the present invention.

FIG. 5A is a configuration diagram showing the configuration of the STB 4 according to the present embodiment.

As shown in FIG. 5A, the STB 4 includes a remote control unit 401, a first memory 402, a second memory 403, a receiving unit 404, a demultiplex unit 405, a descrambler 406, a TS decoder 407, a video output unit 408, an audio output unit 409, an HDMI-CEC communication unit 410, a microcomputer 411, an EPG control unit 412, a device control unit 413, and a correspondence table storage unit 414.

In the present embodiment, a device linkage apparatus 100 which causes the linking of the operations of the amplifier 2 and the television 1, and so on, that are used in the reproduction of a TV-program, includes the device control unit 413, and the correspondence table storage unit 414.

The STB 4 can be operated by the user directly or with the use of a remote control device (not illustrated) (hereafter called STB remote control).

When the remote control reception unit 401 receives a command sent from the STB remote control, the microcomputer 411 performs processing according to the command. In other words, the microcomputer 411 controls the receiving unit 404, the demultiplex unit 405, the descrambler unit 406, the TS decoder 407, and the HDMI-CEC communication unit 410.

The first memory 402 is configured of a Random Access Memory (RAM) and the like, and is used when the microcomputer 411 temporarily stores data.

The second memory 403 is configured of a device, such as a flash memory, a hard disk, or the like, that can hold information even when power is turned off. Note that the second memory 403 may also be configured as a detachable storage device such as a Secure Digital™ (SD) memory card and the like.

The receiving unit 404, which is connected to a cable from a cable television station, receives a broadcast signal, tunes to the frequency specified by the microcomputer 411, extracts an MPEG transport stream, and passes the extracted MPEG transport stream to the demultiplex unit 405.

The demultiplex unit 405 receives the MPEG transport stream from the receiving unit 404, extracts information specified by the microcomputer 411 from the MPEG transport stream, and passes the extracted information to the microprocessor 411. In addition, demultiplex unit 405 passes the MPEG transport stream directly to the descrambler 406.

The descrambler 406 descrambles (decrypts) the scrambled MPEG transport stream provided by the demultiplex unit 405, and passes the result to the TS decoder 407. The descrambler 406 may be a module built-into the STB 4, and may also be implemented through the CableCARD™ introduced in North American cable receivers. The specifications of CableCARD is described in the CableCARD Interface Specification laid out by the CableLabs in the United States, and thus description is omitted herein.

The TS decoder 407 receives the identifiers of audio data and video data from the microcomputer 411. In addition, the TS decoder 407 extracts, from the descrambled stream received from the descrambler 406, audio data and video data corresponding to the received identifiers of the audio data and video data. Then, the TS decoder 407 passes the extracted video data to the video output unit 408, and the audio data to the audio output unit 409. Furthermore, the TS decoder 407 passes both (the video data and the audio data) to the HDMI-CEC communication unit 410.

The video output unit 408, which includes a video output terminal, converts the received video data to video data that complies with the video output terminal and outputs the converted video data. An example of the video output terminal is a composite cable terminal, and so on.

The audio output unit 408, which includes an audio output terminal, converts the received audio data to audio data that complies with the audio output terminal and outputs the converted audio data. Examples of the audio output terminal are earphone terminals, the composite cable terminal, and so on.

The HDMI-CEC communication unit 410, which includes an HDMI terminal, converts the received video data and audio data into a video and audio data format that complies with the HDMI specification and outputs the converted video data and audio data. Furthermore, upon receiving an instruction for HDMI-CEC command transmission from the microcomputer 411, the HDMI-CEC communication unit 410 converts a predetermined command into a data format based on the HDMI specification, then outputs such command. Furthermore, the HDMI-CEC communication unit 410 passes the HDMI-CEC command received through the HDMI terminal to the microcomputer 411.

Figure 5B:
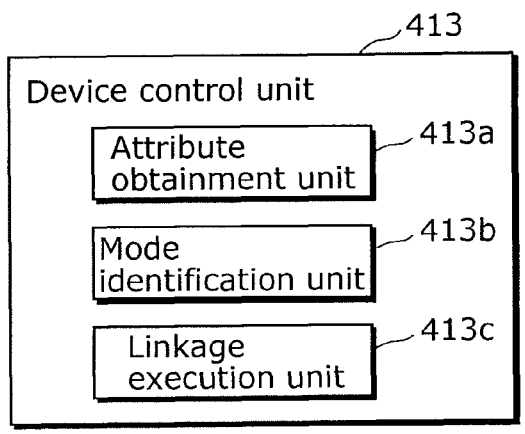
FIG. 5B is a configuration diagram of a device control unit according to the embodiment of the present invention.

FIG. 5B is a configuration diagram showing the internal configuration of the device control unit 413.

The device control unit 413 includes an attribute obtainment unit 413a, a mode identification unit 413b, and a linkage execution unit 413c.

The attribute obtainment unit 413a obtains (extracts) genre information which is the attribute of a TV-program to be reproduced. The mode identification unit 413b identifies an audio output mode corresponding to the attribute obtained by the attribute obtainment unit 413a, from among audio output modes shown in a mode correspondence table 414a described later. The linkage execution unit 413c causes the operation of the television 1 and the amplifier 2 to be linked according to the audio output mode identified by the mode identification unit 413b, by causing the HDMI-CEC communication unit 410 to transmit an HDMI-CEC command. As a result, the television 1 and the amplifier 2 reproduce the TV-program to be reproduced, in such audio output mode.

The EPG control unit 412 includes: a TV-program display unit (not illustrated) which displays a list of television programs and receives input from the user; and a reproduction unit (not illustrated) which performs channel selection. Here, EPG is an abbreviation of Electric Program Guide. The TV-program display unit waits for an input from the user through the remote control reception unit 410 of the STB 4.

Figure 6:
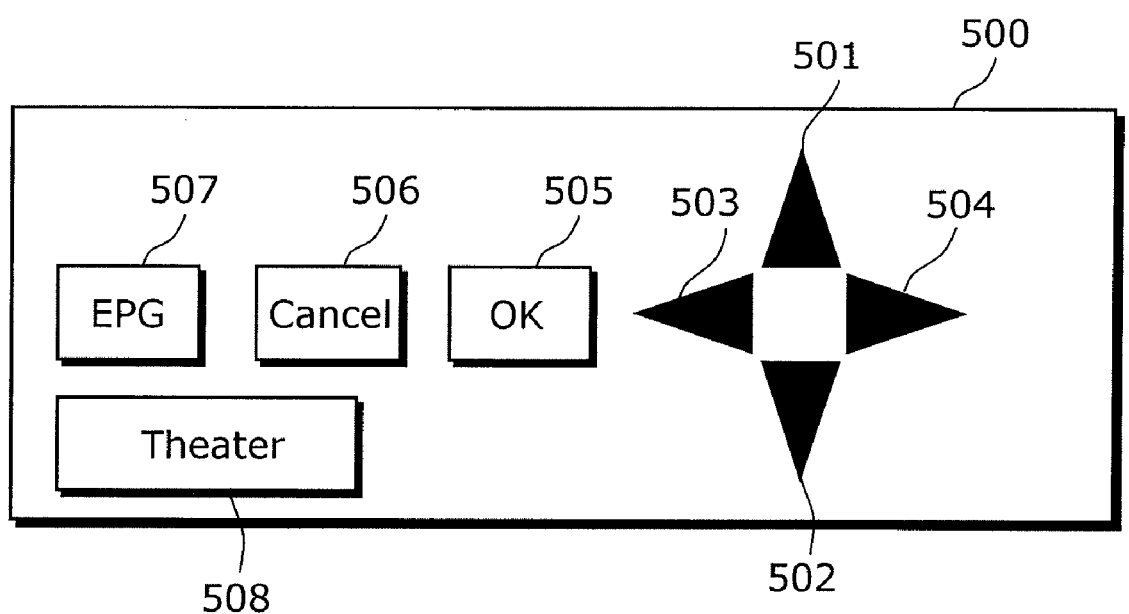
FIG. 6 is a configuration diagram of an operation panel of a remote control for the STB according to the embodiment of the present invention.

FIG. 6 is a diagram showing the operating panel of the STB remote control.

As shown in FIG. 6, an operating panel 500 includes eight buttons, namely, an up-cursor button 501, a down-cursor button 502, a left-cursor button 503, a right-cursor button 504, an OK button 505, a cancel button 506, an EPG button 507, and a theater button 508. When the user presses down a button, the identifier of such pressed button is notified to the microcomputer 411 via the remote control unit 401.

When the user presses the EPG 507 of the operating panel 500 in the STB remote control, the identifier of the EPG button is notified to the microcomputer 411 via the remote control unit 401. Upon receiving the identifier, the TV-program display unit of the EPG control unit 412 causes TV-program information display data to be outputted from the HDMI-CEC communication unit 410 to the television 1. The television 1 receives the TV-program information display data and displays a TV-program list (EPG).

Figure 7A:
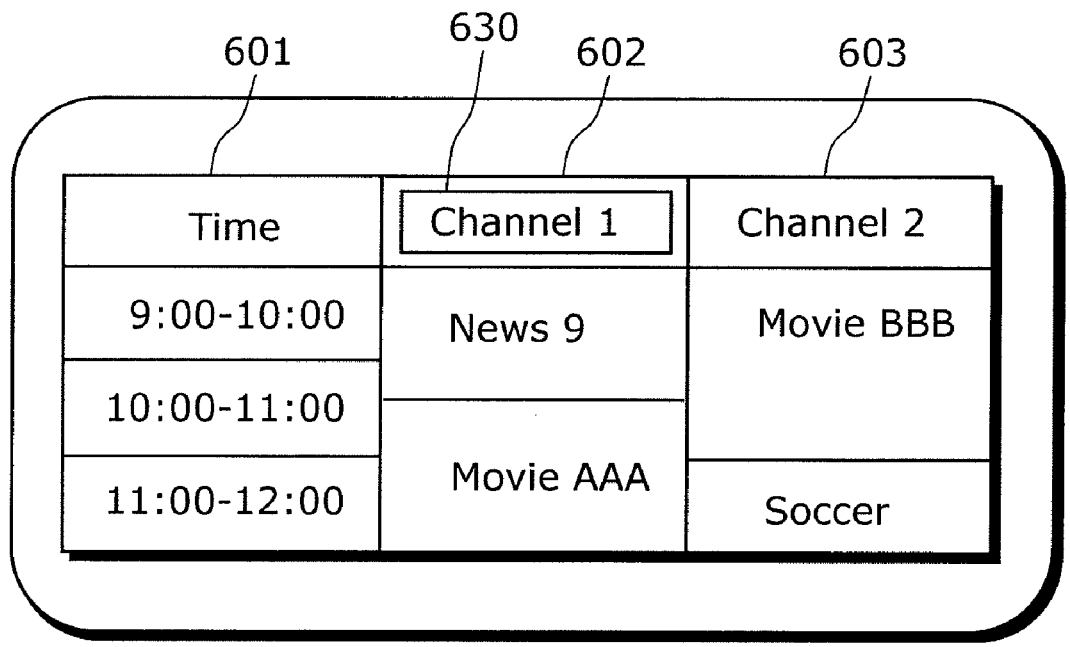
FIG. 7A is a diagram showing an example of a TV-program list according to the embodiment of the present invention.
Figure 7B:
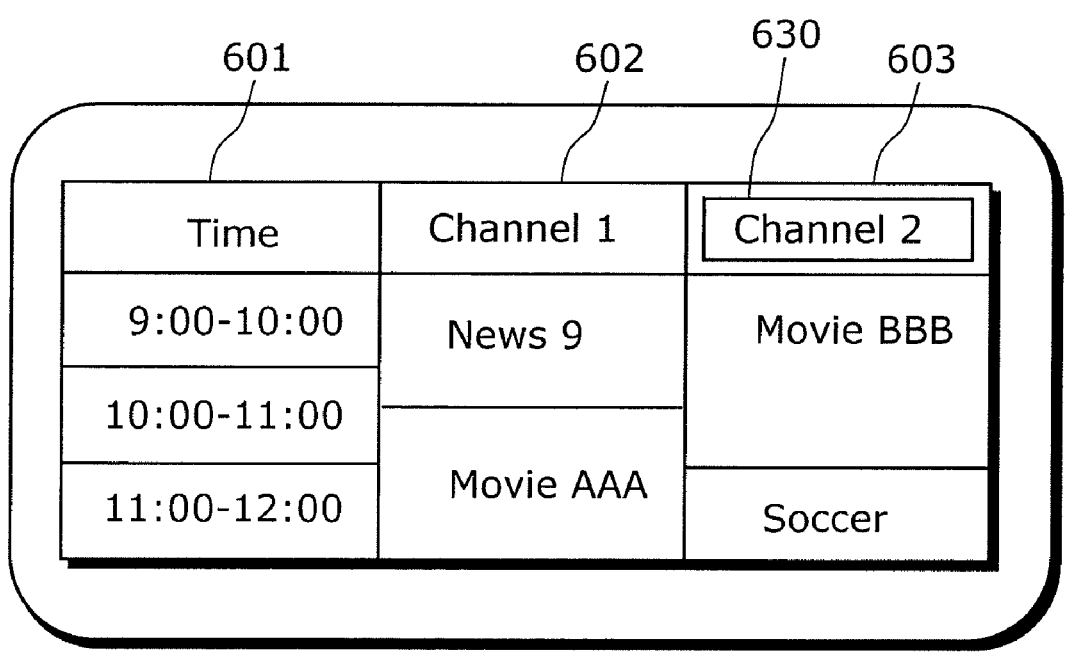
FIG. 7B is a diagram showing another example of a TV-program list according to the embodiment of the present invention.

FIGS. 7A and 7B are diagrams showing an example of the TV-program list displayed on the television 1.

As shown in FIG. 7A, TV-program information is displayed on the television 1 in a grid pattern. A column 601 displays time information. A column 602 displays a channel name "Channel 1" and TV-programs to be broadcast during time periods corresponding to the respective times described in the column 601. The television 1 shows that, on "Channel 1", a TV-program "News 9" is broadcast from 9:00 to 10:30, and "Movie AAA" is broadcast from 10:30 to 14:00. As in the case of the column 602, a column 603 displays a channel name "Channel 2" and TV-programs to be broadcast during time ranges corresponding to the respective times described in the column 601. A TV-program "Movie BBB" is broadcast from 9:00 to 11:00, and "Soccer" is broadcast from 11:00 to 14:00. A cursor 630 moves at the press of the left-cursor button 503 or the right-cursor button 504 on the operating panel 500. When the right-cursor button 504 is pressed down in the state illustrated in FIG. 7A, the cursor 630 moves towards the right as shown in FIG. 7B. Furthermore, when the left-cursor button 503 is pressed down in the state illustrated in FIG. 7B, the cursor 630 moves towards the left as shown in FIG. 7A.

When the OK button 505 on the operating panel 500 is pressed down in the state shown in FIG. 7A, the TV-program display unit of the EPG control unit 412 notifies the reproduction unit of the identifier of the "Channel 1". When the OK button 505 on the operating panel 500 is pressed down in the state shown in FIG. 7B, the TV-program display unit notifies the reproduction unit of the identifier of the "Channel 2".

Furthermore, through the demultiplex unit 405, the TV-program display unit of the EPG control unit 412 regularly stores TV-program information display data, in advance, in the second memory 403. Generally, it takes time to obtain TV-program information from the broadcast station. It is possible to quickly display a TV-program list by displaying the TV-program information display data previously stored in the second memory 403, at the press of the EPG button 507 of the operating panel 500.

FIG. 8 is a diagram showing an example of TV-program information display data stored in the second memory 403.

The TV-program information display data is stored in tabular form. A column 701 describes the identifiers of channels. A column 702 describes TV-program names. A column 703 describes the broadcast start times of the TV-programs, and a column 704 describes the broadcast end times. A column 705 describes the audio type of the TV-programs, and indicates mono audio, stereo audio, and 5.1 channel audio as "mono", "stereo", and "5.1", respectively. A column 706 describes the type (genre information) of the TV-programs. The type (genre information) for a regular TV-program is described as an empty cell, the type (genre information) for a movie program is described as "movie", and the type (genre information) for a sports program is described as "spo". Each of rows 711 to 714 describes information for one TV-program. In this example, one TV-program information is the set of the channel identifier, TV-program name, broadcast start time, broadcast end time, TV-program audio type, and TV-program type. For example, the row 711 describes a set which includes "1" as the channel identifier, "news 9" as the TV-program name, "9:00" as the broadcast start time, "10:30" as the broadcast end time, "mono" as the audio type, and "regular" as the TV-program type.

The reproduction unit reproduces the TV-program of a channel using the received identifier of the channel, that is, it reproduces the video and audio making up the channel. The relationship between channel identifiers and channels is pre-stored in the second memory 403 as channel information.

Figure 9:
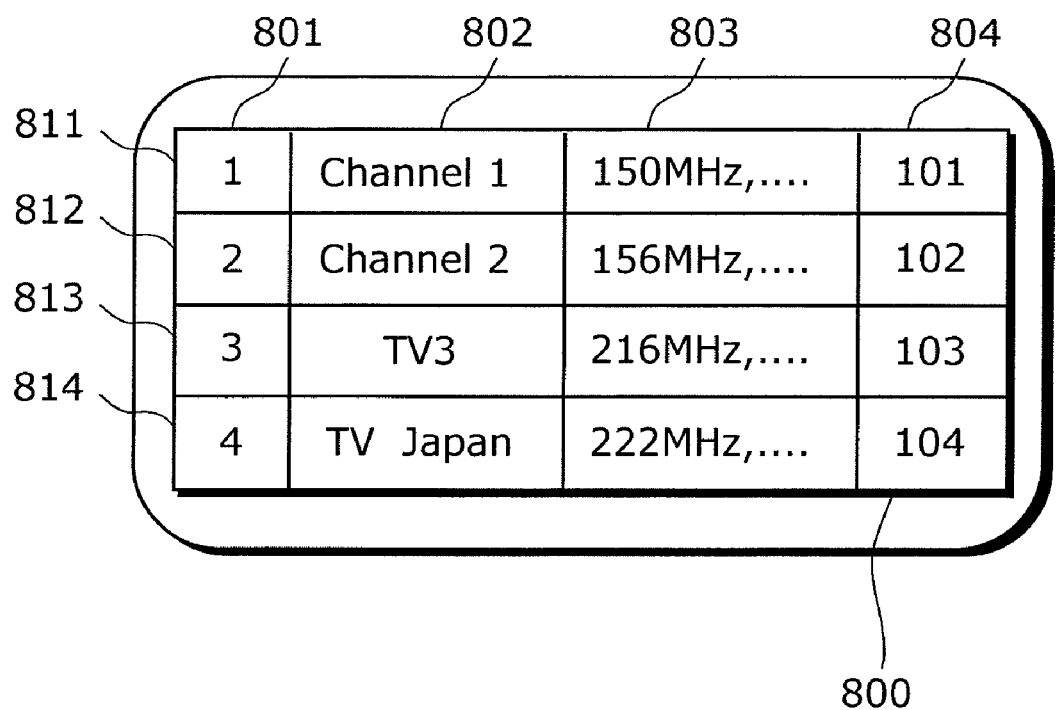
FIG. 9 is a diagram showing an example of channel information stored in the second memory according to the embodiment of the present invention.

FIG. 9 is a diagram showing an example of the channel information stored in the second memory 403.

The channel information is stored in tabular form. In other words, a channel information table 800 indicating plural channel information in tabular form is stored in the second memory 403. A column 801 describes the identifiers of channels. A column 802 describes channel names. A column 803 describes tuning information. Here, the tuning information are values to be provided to the receiving unit 404, such as frequency, transmission rate, and coding ratio. A column 804 describes program numbers. A program number is a number used to identify a PMT (Program Map Table) defined by the MPEG-2 standard. Each of rows 811 to 814 indicates a set of the identifier, channel name, tuning information, and program number of each channel. The row 811 describes a set that includes "1" as an identifier, "Channel 1" as a channel name, a frequency of "150 MHz" as tuning information, and "101" as a program number. In order to reproduce a channel, the reproduction unit uses the received identifier of the channel, and reproduces the TV-program of the channel.

Moreover, when the user presses down the up-cursor button 501 or the down-cursor button 502 on the operating panel 500 while reproduction is taking place, the reproduction unit receives a notification about such pressing from the remote control reception unit 401 through the microcomputer 411, and changes the channel of TV-program being reproduced accordingly. In other words, when the up-cursor button 501 is pressed down by the user, the reproduction unit reproduces the TV-program of a channel having the next lower channel identifier to the channel of the currently-reproduced TV-program, and when the down-cursor button 502 is pressed down by the user, the reproduction unit reproduces the TV-program of a channel having the next higher channel identifier to the channel of the currently-reproduced TV-program. Then, the reproduction unit stores, in the second memory 403, the channel identifier of the TV-program that is currently reproduced.

Figure 10A:
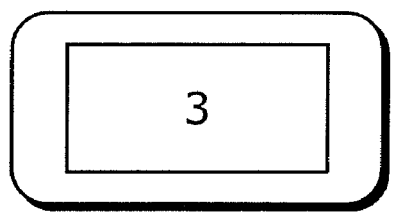
FIG. 10A is a diagram showing an example of a channel identifier stored in the second memory according to the embodiment of the present invention.
Figure 10B:
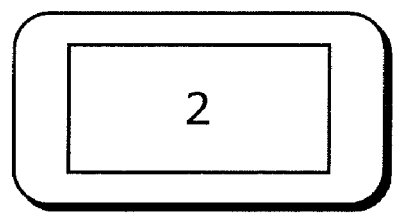
FIG. 10B is a diagram showing another example of a channel identifier stored in a second memory according to the embodiment of the present invention.
Figure 10C:
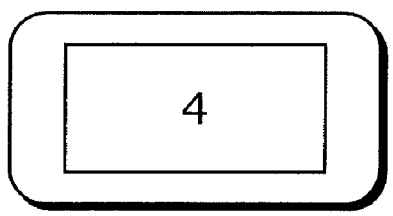
FIG. 10C is a diagram showing yet another example of a channel identifier stored in the second memory according to the embodiment of the present invention.

FIG. 10A, FIG. 10B, and FIG. 10C are diagrams showing an example of a channel identifier stored in the second memory 403.

As shown in FIG. 10A, in the case where an identifier "3" is stored, such channel identifier indicates that the TV-program of a channel having the channel name "TV 3" is currently being reproduced, as shown in FIG. 9. When the user presses down the up-cursor button 501 in a state illustrated in FIG. 10A, the reproduction unit refers to the channel information table 800 shown in FIG. 9, and switches reproduction to the TV-program of the channel with the channel name of "Channel 2" which is the channel having a channel identifier that is one value lower than that of the currently-reproduced channel in the table. At the same time, the reproduction unit rewrites the channel identifier stored in the second memory 403 to the channel identifier "2". FIG. 10B shows the state in which the channel identifier has been rewritten. Furthermore, when the user presses down the down-cursor button 502 in a state illustrated in FIG. 10A, the reproduction unit refers to the channel information table 800 shown in FIG. 9, and switches reproduction to the TV-program of the channel having the channel name of "TV Japan" which is the channel having a channel identifier which is one value higher than that of currently-reproduced channel in the table. At the same time, the reproduction unit rewrites the channel identifier stored in the second memory 403 to the channel identifier "4". FIG. 10C shows the state in which the channel identifier has been rewritten. The channel identifier is saved, even when power to the STB 4 is cut-off, since it is stored in the second memory 403.

In addition, upon being activated when power to the STB 4 is turned on, the reproduction unit reads the channel identifier stored in the second memory 403. Thus, when power is turned on, the STB-4 is able to start the reproduction of the channel of the last TV-program that was reproduced during its previous operation.

The device control unit 413 controls the HDMI-CEC communication unit 410, and controls other devices connected through the HDMI cable. Hereinafter, the specific operation of the device control unit 413 shall be described.

The device control unit 413 transmits an HDMI-CEC command for turning ON and OFF the power to devices (the television 1 and the amplifier 2, in the system in the present embodiment, shown in FIG. 2B) connected to the HDMI-CEC communication unit 410 of the STB 4, though the HDMI cable. By transmitting this command, power to the connected devices can be turned ON or OFF. In actuality, before transmitting this command, the device control unit 413 checks the power source state of a connected device by transmitting and receiving an HDMI-CEC command. If the power is not ON, the device control unit 413 transmits a power ON command. With this, the device control unit 413 can control the communication traffic and processing time delay accompanying HDMI-CEC command transmission and reception. Furthermore, after transmitting the power ON or OFF command, the device control unit 413 checks whether the connected device has transitioned to the desired power source state, by regularly transmitting a command for checking the power source state of the connected device.

Furthermore, the device control unit 413 transmits an HDMI-CEC command to the television 1 and the amplifier 2, and switches between the theater mode and the television mode. This process is performed by sequentially transmitting plural HDMI-CEC commands. In this regard, a more specific process shall be described below.

With this command transmission, the distribution source of the video and audio is the STB 4. Furthermore, upon receiving a HDMI-CEC command indicating a switch to the theater mode, the television 1 causes the termination of the audio output from the speaker 208 of the television 1, that is, turns ON the mute, and causes only the display of the received video on the display 207. On the other hand, upon receiving an HDMI-CEC command indicating the switching to the theater mode, the amplifier 2 outputs, to the speaker 3, the audio signal sent through the HDMI cable from is the STB 4, and causes the output of audio from the speaker 3. Here, when the audio signal outputted from the STB 4 is in mono, the amplifier 2 outputs mono audio. Furthermore, when the audio signal is in stereo, the amplifier 2 outputs stereo audio, and when the audio signal is for the 5.1 channel, the amplifier 2 outputs audio for the 5.1 channel.

Furthermore, the STB 4 terminates the theater mode and switches the audio output mode to the television mode by sending an HDMI-CEC command indicating the switching to the television mode. In this case, upon receiving the HDMI-CEC command indicating the switching to the television mode, the television 1 causes the output of audio from the speaker 208 of the television 1, that is, turns OFF the mute, and causes the output of the received video and audio. On the other hand, upon receiving the HDMI-CEC command indicating the switching to the television mode, the amplifier 2 causes the termination of the audio output from the speaker 3.

Based on the genre information (type) of the TV-program received by the STB 4 and reproduced in the television 1, the device linkage apparatus 100 in the present embodiment switches the audio output mode of the TV-program to the mode that is best suited to the TV-program, that is, one of the television mode and the theater mode.

Hereinafter, this operation shall be described in detail with reference to the Drawings.

The correspondence table storage unit 414 of the STB 4 stores a mode correspondence table 414a defining the correspondence relationship between genre information (type) included in TV-program information obtained through the demultiplex unit 405 and the audio output mode corresponding to the genre information.

Figure 11:
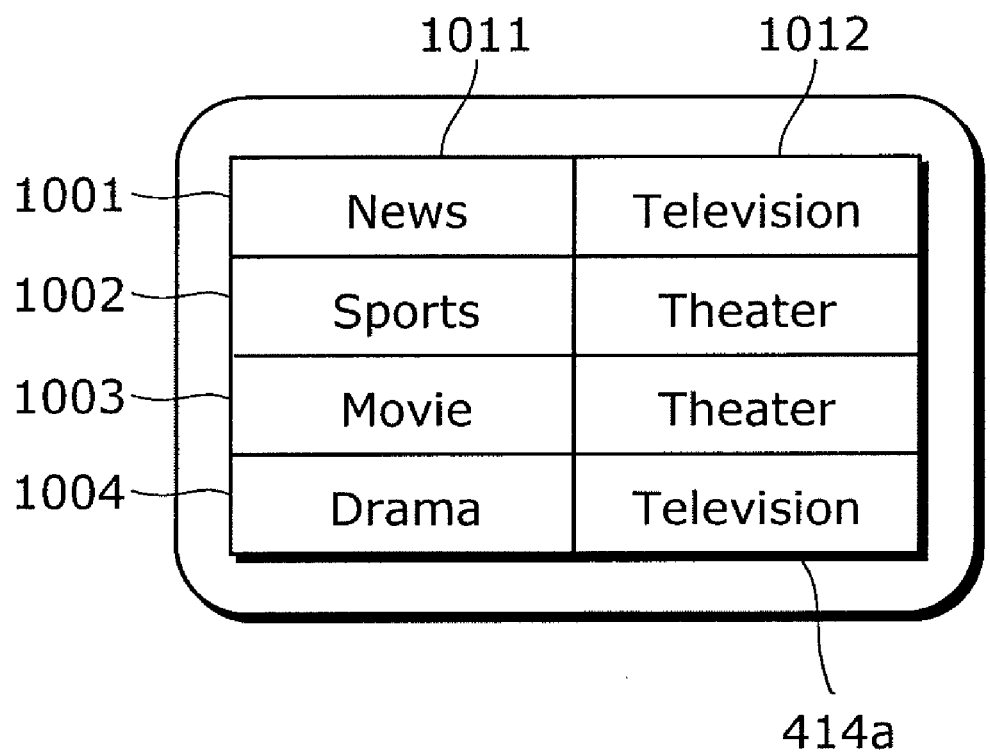
FIG. 11 is a diagram showing an example of a mode correspondence table according to the embodiment of the present invention.

FIG. 11 is a diagram showing an example of the mode correspondence table 414a stored in the correspondence table storage unit 414. In this example, the correspondence relationship between genre information and audio output modes are stored in tabular form. A column 1011 is the genre name which is the genre information. A column 1012 is the audio output mode corresponding to the genre name in column 1011. Furthermore, in FIG. 11, television indicates the television mode, and theater indicates the theater mode. At least "television (television mode)" or "theater (theater mode)" is set in the audio output mode of column 1012. Each of rows 1001 to 1002 indicates the correspondence relationship between the genre information and the audio output modes. For example, row 1001 is the set indicating a genre name "news" and an audio output mode "television mode".

In the present embodiment, such correspondence relationship between the genre information and audio output mode, that is, the mode correspondence table 414a, is created to include predetermined details as initial values and stored in the correspondence table storage unit 414 beforehand. Furthermore, the STB 4 may be configured so as to allow the details of the mode correspondence table 414a to be changed to desired details through the user's operation of the STB 4, such as to allow the addition of an audio output mode, for example. In addition, the STB 4 may be configured so as to allow the details of the mode correspondence table 414a to be updated using data, and the like, that is multiplexed into a broadcast signal. Furthermore, the STB 4 may be configured so as to allow the mode correspondence table 414a to be obtained from a broadcast signal. Since the method for such changing and updating can be easily implemented through conventional techniques, detailed explanation shall be omitted.

Figure 12:
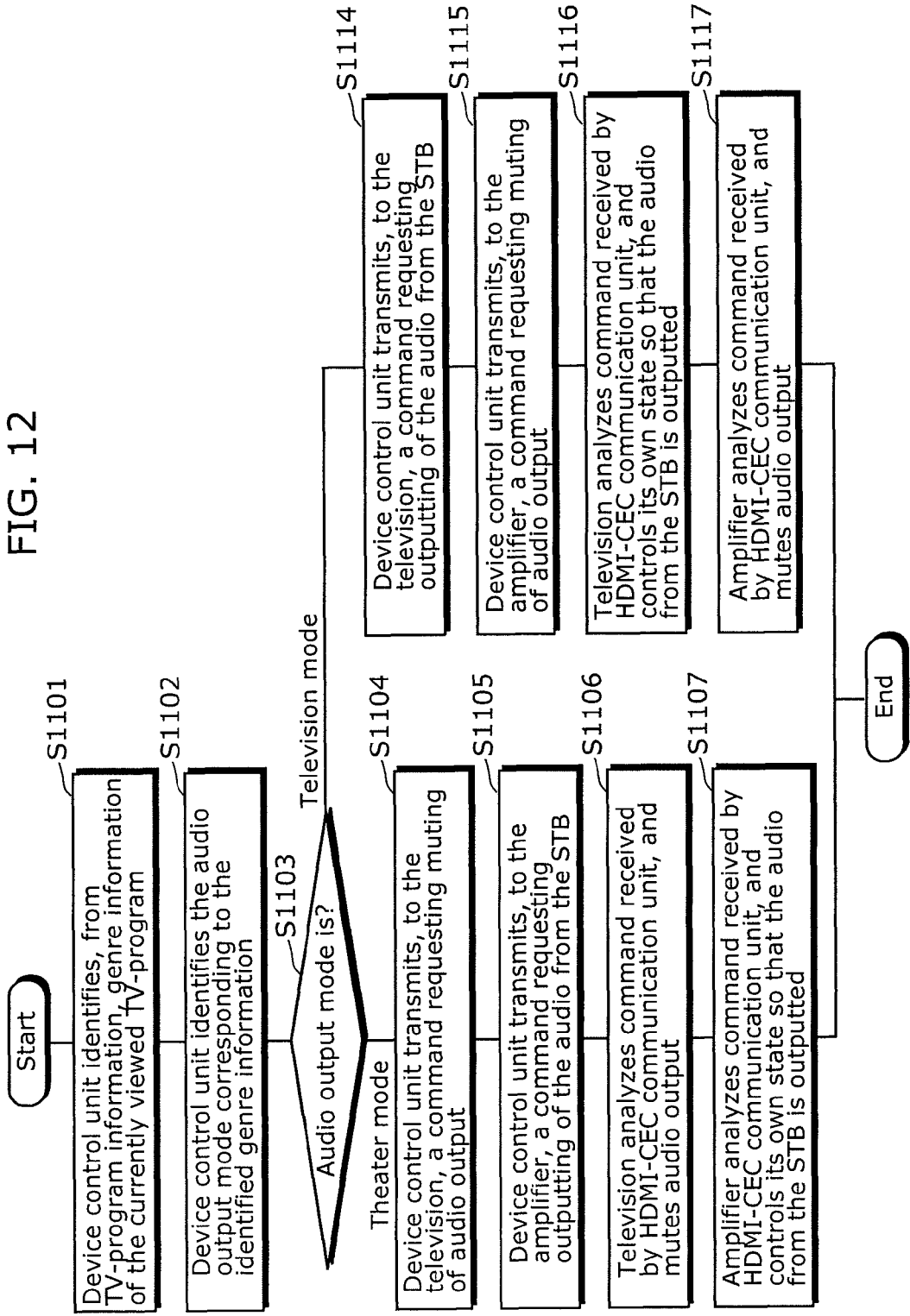
FIG. 12 is a flowchart showing the operation of the home theater system according to the embodiment of the present invention.

Next, the flow of the process in the present embodiment shall be described using FIG. 12.

FIG. 12 is a flowchart showing the operation of the home theater system in the present embodiment.

First, the attribute obtainment unit 413a of the device control unit 413 extracts genre information from the TV-information of a received TV-program. For example, the attribute obtainment unit 413a of the device control unit 413 extracts the genre information included in the TV-information of the received TV-program, from among the TV-program information display data indicated in FIG. 8. Specifically, in the case where the channel identifier of the TV-program reproduced at a time 11 o'clock is "1", the attribute obtainment unit 413a of the device control unit 413 extracts "movie" as the genre information (step S1101).

When the genre information is extracted in step S1101, the mode identification unit 413b of the device control unit 413 refers to the mode correspondence table 414a described in FIG. 11 and identifies whether the audio output mode corresponding to the extracted genre information is the "television mode" or the "theater mode". For example, when the genre information extracted in step S1101 is "movie", the mode identification unit 413b of the device control unit 413 refers to the mode correspondence table 414a described in FIG. 11 and identifies the "theater mode" as the audio output mode corresponding to "movie". Furthermore, when the genre information extracted in step S1101 is "news", the mode identification unit 413b of the device control unit 413 identifies the "television mode" as the audio output mode (step S1102).

The linkage execution unit 413c of the device control unit 413 judges whether the audio output mode identified in step S1102 is the "theater mode" or the "television mode" (step S1103).

Upon judging that the audio output mode is the theater mode (theater mode in step S1103), the linkage execution unit 413c of the device control unit 413 transmits, to the television 1 via the HDMI-CEC communication unit 410, an HDMI-CEC command requesting the muting of the audio output of the television 1. In this case, the HDMI-CEC command is transmitted to the television 1 via the amplifier 2 (step S1104).

Furthermore, the linkage execution unit 413c of the device control unit 413 transmits, to the amplifier 2 via the HDMI-CEC communication unit 410, an HDMI-CEC command for causing the output of the audio signal from the speaker output unit 306.

When an HDMI-CEC command is transmitted from the STB 4 via the amplifier 2 in step S1104, the HDMI-CEC communication unit 204 of the television 1 receives such transmitted command and outputs the received command to the microcomputer 203. The microcomputer 203 of the television 1 analyzes the command and suppresses, that is, mutes the audio to be outputted from the speaker 208 (step S1106).

When an HDMI-CEC for causing the output of audio from the speaker output unit 306 is transmitted from the HDMI-CEC communication unit 410 of the STB 4 in step S1105, the HDMI-CEC communication unit 303 of the amplifier 2 receives such transmitted command and outputs the received command to the microcomputer 302. The microcomputer 302 of the amplifier 2 analyzes the command and causes an audio signal to be outputted from the speaker output unit 306, via the selector 304 (step S1107). Here, when the audio signal outputted from the STB 4 is in mono, the amplifier 2 outputs mono audio. Furthermore, when the audio signal is in stereo, the amplifier 2 outputs stereo audio, and when the audio signal is for the 5.1 channel, the amplifier 2 outputs audio for the 5.1 channel. Furthermore, the amplifier may also artificially change stereo audio to 5.1 channel audio and output the 5.1 channel audio, or conversely artificially change 5.1 channel audio to stereo audio and output the stereo audio.

With the process in steps S1104 to 1107 described above, the device linkage apparatus 100 in the present embodiment outputs audio in the theater mode.

On the other hand, upon judging that the audio output mode is the television mode (television mode in step S1103), the linkage execution unit 413c of the device control unit 413 transmits, to the television 1 via the HDMI-CEC communication unit 410, an HDMI-CEC command requesting the cancellation of the muting of the audio output of the television 1, that is, an HDMI-CEC command requesting the outputting of audio (step S1114). In this case, the HDMI-CEC command is transmitted to the television 1 via the amplifier 2.

Furthermore, the linkage execution unit 413c of the device control unit 413 transmits, to the amplifier 2 via the HDMI-CEC communication unit 410, an HDMI-CEC command requesting the suppression of the output of the audio signal from the speaker output unit 306, that is, an HDMI-CEC command requesting the muting of audio output from the speaker 3 (step S1115).

When an HDMI-CEC command is transmitted from the STB 4 via the amplifier 2 in step S1114, the HDMI-CEC communication unit 204 of the television 1 receives such transmitted command and outputs the received command to the microcomputer 203. The microcomputer 203 of the television 1 analyzes the command and cancels the muting of audio output and causes the output of audio from the speaker 208 (step S1116).

When an HDMI-CEC requesting the suppression of the output of the audio signal from the speaker output unit 306 is transmitted from the HDMI-CEC communication unit 410 of the STB 4 in step S1115, the HDMI-CEC communication unit 303 of the amplifier 2 receives such transmitted command and outputs the received command to the microcomputer 302. The microcomputer 302 of the amplifier 2 analyzes the command, and suppresses the output the audio signal from the speaker output unit 306, that is, mutes the audio output from the speaker 3 (step S1117).

With the process in steps S1114 to 1117 described above, the device linkage apparatus 100 in the present embodiment outputs audio in the television mode.

According to the above-described processes, with the device linkage apparatus 100 in the present embodiment, the switching between outputting audio from the speaker 208 of the television 1 or outputting audio from the speaker 3 connected to the amplifier 2 can be performed automatically according to the mode correspondence table 414a and in conformance to the genre information received by the STB 4, without requiring the user's operation each time. As a result, it is possible to easily view movies and the like with audio having realistic sensation. In other words, with the device linkage apparatus 100 in the present embodiment, by the extracting genre information of a currently viewed TV-program from TV-program information received by the STB 4 and changing to an audio output mode that is appropriate for the extracted genre information, using an HDMI-CEC command, changing to the appropriate audio output mode corresponding to the genre can be performed automatically.

Furthermore, the order of the process described in FIG. 12 is merely an example, and it goes without saying that the process order may be different as long as a substantially equivalent operation is performed. In addition, the device control unit 413 may operate in such a manner that the process in FIG. 12 is not performed in the case where the connection environment is checked in advance and the environment is one in which switching between the television mode and the theater mode cannot be implemented. A connection environment that does not allow switching is an environment in which a device for implementing predetermined device linkage operations is not HDMI-connected, for example, an environment in which the amplifier 2 is not HDMI-connected to the STB 4 and only the STB 4 and the television 1 are connected.

(First Modification)

Next, a first modification in the embodiment of the present invention shall be described.

Although the audio output mode is changed based on the TV-program genre information in the previously described embodiment, in the present modification, the audio output mode is switched based on channel information. In other words, based on the channel information of the TV-program received by the STB 4 and reproduced in the television 1, the device linkage apparatus 100 in the present modification switches the audio output mode of the TV-program to the mode that is best suited to the TV-program, that is, one of the television mode and the theater mode.

The correspondence table storage unit 414 of the STB 4 in the present modification stores a mode correspondence table defining the correspondence relationship between the channel number specified by a channel identifier and the audio output mode corresponding to the channel number (channel identifier).

Figure 13:
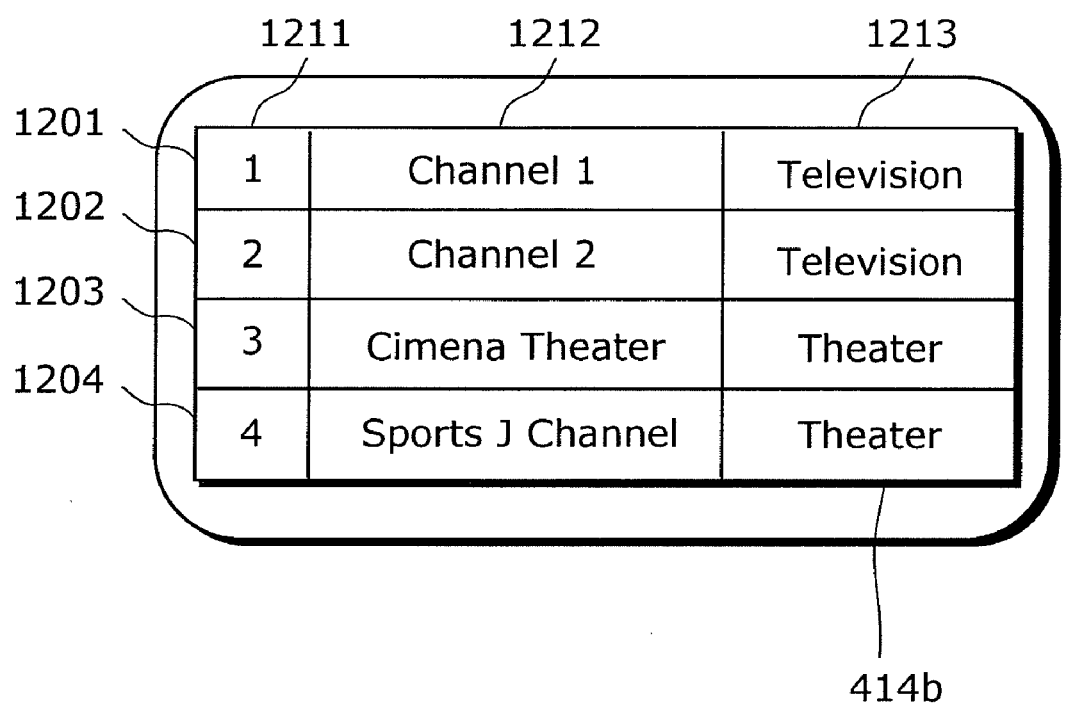
FIG. 13 is a diagram showing an example of a mode correspondence table according to a first modification of the embodiment of the present invention.

FIG. 13 is a diagram showing an example of the mode correspondence table stored in the correspondence table storage unit 414 in the present modification.

The correspondence table storage unit 414 in the present modification stores a mode correspondence table 414b shown in FIG. 13. In this example, the correspondence relationship between channel identifiers and audio output modes are stored in tabular form. A column 1211 indicates the channel identifier, a column 1212 indicates the broadcast station name, and a column 1213 indicates the audio output mode. Furthermore, in FIG. 13, television indicates the television mode, and theater indicates the theater mode. At least "television (television mode)" or "theater (theater mode)" is set in the audio output mode of column 1213. Each of rows 1201 to 1203 is a set indicating the correspondence relationship among the channel identifier, the broadcast station name, and the audio output mode. For example, row 1201 is the set indicating a channel identifier "1", a broadcast station name "channel 1", and an audio output mode "television mode".

In the present modification, such correspondence relationship between the channel information and audio output mode, that is, the mode correspondence table 414b, is created to include predetermined details as initial values and stored in the correspondence table storage unit 414 beforehand Furthermore, the STB 4 may be configured so as to allow the details of the mode correspondence table 414b to be changed to desired details through the user's operation of the STB 4. In addition, the STB 4 may be configured so as to allow the details of the mode correspondence table 414b to be updated using data, and the like, that is multiplexed into a broadcast signal. Since the method for such changing and updating can be easily implemented through conventional techniques, detailed explanation shall be omitted.

Figure 14:
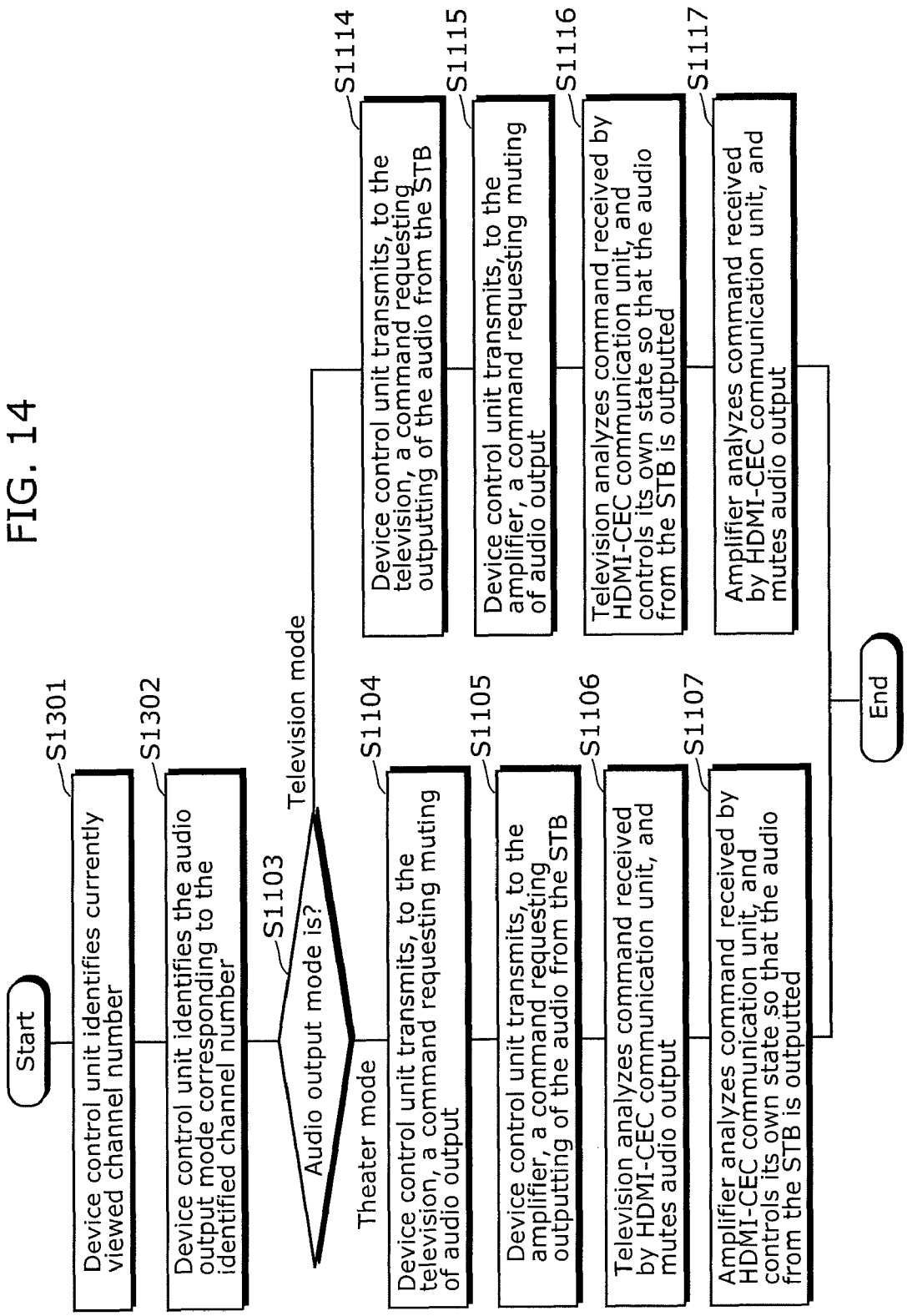
FIG. 14 is a flowchart showing the operation of a home theater system according to the first modification of the embodiment of the present invention.

Next, the flow of the process in the present modification shall be described using FIG. 14.

FIG. 14 is a flowchart showing the operation of the home theater system in the present modification. Furthermore, processes in FIG. 14 which are the same as in FIG. 12 are affixed with the same numerical reference and description shall be omitted.

First, the attribute obtainment unit 413a of the device control unit 413 detects the channel number (channel identifier) indicating the channel of the currently reproduced (viewed) TV-program. For example, the attribute obtainment unit 413a of the device control unit 413 identifies, from within the channel information table shown in FIG. 9, the channel number (channel identifier) indicating the channel of the currently reproduced (viewed) TV-program. For example, the attribute obtainment unit 413a of the device control unit 413 identifies the channel number "1" (step S1301).

When the currently viewed channel number is identified in step S1301, the mode identification unit 413b of the device control unit 413 refers to the mode correspondence table 414b shown in FIG. 13 and identifies whether the audio output mode corresponding to the currently viewed channel number (channel identifier) is the "television mode" or the "theater mode". For example, when the identified channel number is "1", the mode identification unit 413b of the device control unit 413 refers to the mode correspondence table 414b described in FIG. 13 and identifies the "television mode" as the audio output mode corresponding to the channel number "1" (step S1302). Furthermore, when the identified channel number is "3", the mode identification unit 413b of the device control unit 413 refers to the mode correspondence table 414b described in FIG. 13 and identifies the "theater mode" as the audio output mode corresponding to the channel number "3".

From here on, the device control unit 413 performs the same operation as in the previously described embodiment, according to whether the audio output mode identified in step S1302 is the "theater mode" or the "television mode". In other words, after step S1302, the home theater system in the present modification performs the operations of steps S1103 to S1117 of the previously described embodiment.

Note that the order of the process described in FIG. 14 is merely an example, and it goes without saying that the process order may be different as long as a substantially equivalent operation is performed.

According to the above-described processes, with the device linkage apparatus 100 in the present modification, the switching between outputting audio from the speaker 208 of the television 1 or outputting audio from the speaker 3 connected to the amplifier 2 can be performed automatically according to the mode correspondence table 414b and in conformance to the genre information received by the STB 4, without requiring the user's operation each time. As a result, when viewing a movie-dedicated channel, and the like, provided by a cable television broadcast service or a digital broadcast service, and so on, it is possible to automatically cause the outputting of audio from multi-channel speakers and easily view movies with audio having realistic sensation, by merely choosing channels. In other words, with the device linkage apparatus 100 in the present modification, by the extracting the channel number of a currently viewed TV-program from TV-program information received by the STB 4 and changing to an audio output mode that is appropriate for the extracted channel number, using an HDMI-CEC command, it is possible to automatically change to the appropriate audio output mode corresponding to the channel number.

(Second Modification)

Next, a second modification in the embodiment of the present invention shall be described.

Although, as shown in FIG. 8, an audio output mode is not included in the TV-program information display data in the previously described embodiment, the audio output mode is included in the TV-program information display data in the present modification. In other words, in the present modification, the optimal audio output mode conforming to a program is specified in the TV-program information attached to the TV-program information display data to be sent as EPG data, and the device linkage apparatus 100 can switch the audio output mode of the TV-program to the specified optimal mode, that is, one of the television mode and the theater mode.

FIG. 15 is a diagram showing an example of TV-program information display data stored in the second memory 403 in the present modification.

The TV-program information display data shown in FIG. 15 has a column 721 that is not included in the TV-program information display data shown in FIG. 8. Column 721 indicates the optimal audio output mode for each TV-program, and the television mode and the theater mode are described as "television" and "theater", respectively. Such TV-program information display data indicates that viewing in the television mode is suited for the TV-program corresponding to row 711, and viewing in the theater mode is suited for the TV-programs corresponding to rows 712 to 714. Here, the audio output mode for each TV-program is broadcast as a part of the TV-program information attached to each TV-program, and stored in the second memory 403 through the demultiplex unit 405.

Furthermore, the device linkage apparatus 100 in the present modification does not include the correspondence table storage unit 414 which stores the mode correspondence tables 414a and 414b.

Figure 16:
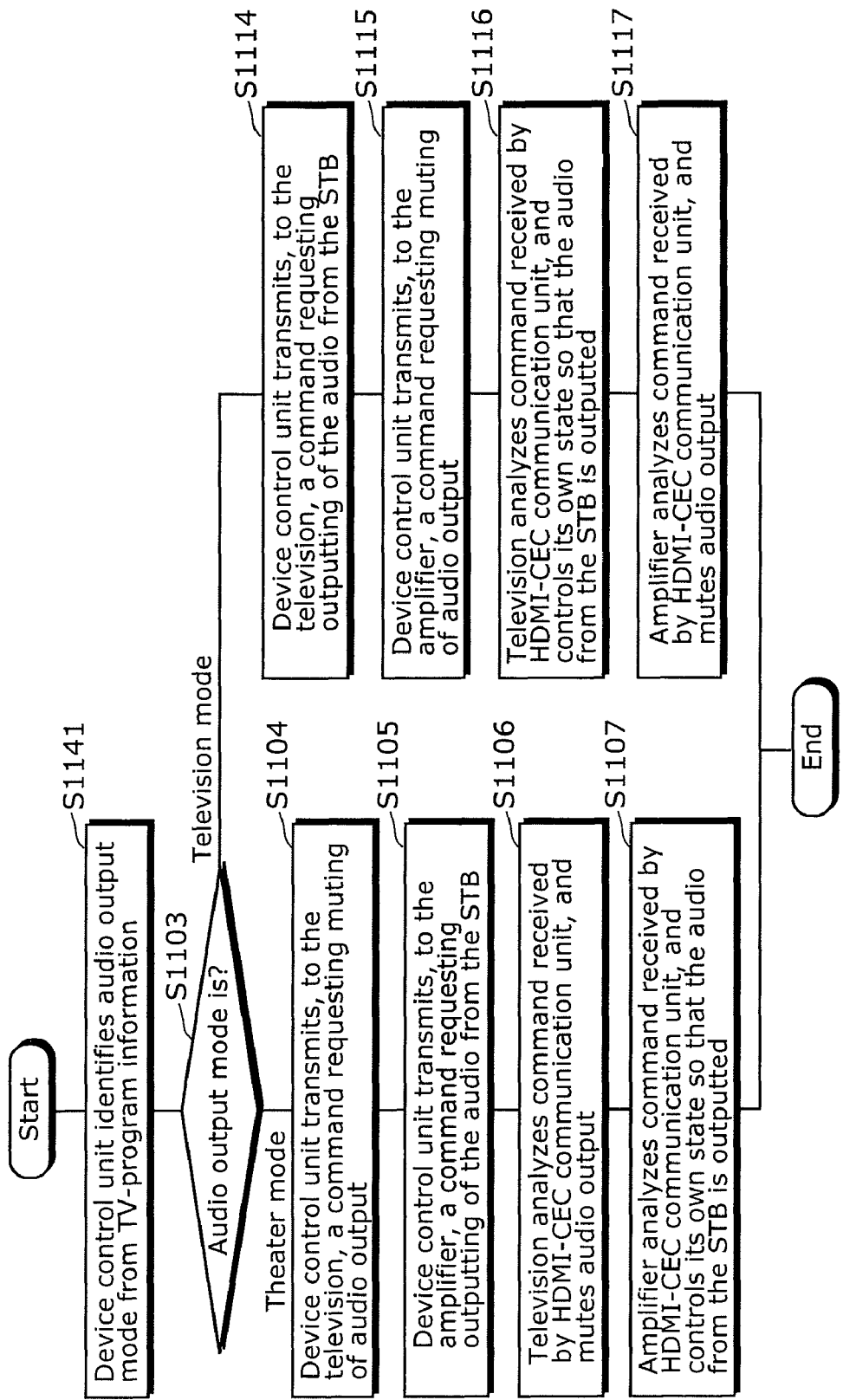
FIG. 16 is a flowchart showing the operation of a home theater system according to the second modification of the embodiment of the present invention.

Next, the flow of the process in the present modification shall be described using FIG. 16.

FIG. 16 is a flowchart showing the operation of the home theater system in the present modification. Note that processes in FIG. 16 which are the same as in FIG. 12 are affixed with the same numerical reference and description shall be omitted.

First, the device control unit 413 obtains, from the TV-program information of a received TV-program, the audio output mode of the program. For example, the mode identification unit 413b of the device control unit 413 identifies the audio output mode included in the TV-information of the received TV-program, from among the TV-program information display data indicated in FIG. 15 (step S1141). For example, in the case where the current time is 11:00 and the channel identifier of the TV-program being reproduced is "1", the mode identification unit 413b of the device control unit 413 detects "theater" as the audio output mode.

From here on, the device control unit 413 performs the same operation as in the previously described embodiment, according to whether the audio output mode obtained in step S1141 is the "theater mode" or the "television mode". In other words, after step S1141, the home theater system in the present modification performs the operations of steps S1103 to S1117 of the previously described embodiment. Note that the order of the process described in FIG. 16 is merely an example, and it goes without saying that the process order may be different as long as a substantially equivalent operation is performed According to the above-described processes, with the device linkage apparatus 100 in the present modification, the switching between outputting audio from the speaker 208 of the television 1 or outputting audio from the speaker 3 connected to the amplifier 2 does not require the user's operation each time. In other words, with the device linkage apparatus 100 in the present modification, it is possible to obtain the audio output mode recommended for each TV-program, from the TV-program information included in the TV-program information display data (EPG data) received by the STB 4, and automatically switch to the recommended audio output mode.

For example, when the genre information of a program is "drama", in general, the appropriate audio output mode for the program is the television mode. However, even when the genre information of a program is "drama", there are cases where the theater mode is more appropriate and the program can be viewed with a realistic sensation. In such a case, the audio output mode can be specified in detail, for each TV-program, according to the intention of the broadcast service provider, and it is possible to cause audio to be outputted from the multi-channel speakers automatically, without the viewer having to perform the troublesome operations for audio output in the theater mode.

(Third Modification)

Next, a third modification in the embodiment of the present invention shall be described.

Although the audio output mode is changed based on the TV-program genre information in the previously described embodiment, in the present modification, aside from the audio output mode, the picture quality and acoustic field are switched. In other words, the television 1 in the present modification has a picture quality and acoustic field adjusting function, and the amplifier 2 in the present modification has an acoustic field control function. In addition, the device control unit 413 in the present modification has a function for switching the settings of the aforementioned picture quality and acoustic field. Note that audio quality is included in the acoustic field, and such acoustic field indicates the magnitude of reflected audio and/or reverberant audio, reverberation time, frequency characteristics, and so on.

The television 1 is configured so as to be able to adjust picture quality, for example, the brightness, contrast, and hue, of the display 207. Such picture quality adjustment is performed according to an instruction from the microcomputer 203 in response to an HDMI-CEC command received by the HDMI-CEC communication unit 204. Here, the picture quality adjustment is easily set, for example, by selecting from preset picture quality modes. Furthermore, the television 1 is configured so as to be able to control the acoustic field of the audio outputted from the speaker 208. Such acoustic field control is performed according to an instruction from the microcomputer 203 in response to an HDMI-CEC command received by the HDMI-CEC communication unit 204. Here, the control of the acoustic field is easily set, for example, by selecting from preset acoustic field modes.

The amplifier 2 is configured so as to be able to control the acoustic field of the audio outputted from the speaker output unit 306. Such acoustic field control is performed according to an instruction from the microcomputer 302 in response to an HDMI-CEC command received by the HDMI-CEC communication unit 303. Here, the control of the acoustic field is easily set, for example, by selecting from preset acoustic field modes. Furthermore, the control of the acoustic field is, more specifically, the performance of signal processing based on: a reverberation characteristic parameter such as the magnitude and quantity of reflected audio, the magnitude of reverberant audio, and reverberation time; and a frequency characteristic parameter. The control of the acoustic field can be implemented using conventional techniques. Furthermore, since video display picture quality adjustment can easily be implemented using conventional techniques, detailed description shall be omitted herein.

Figure 17:
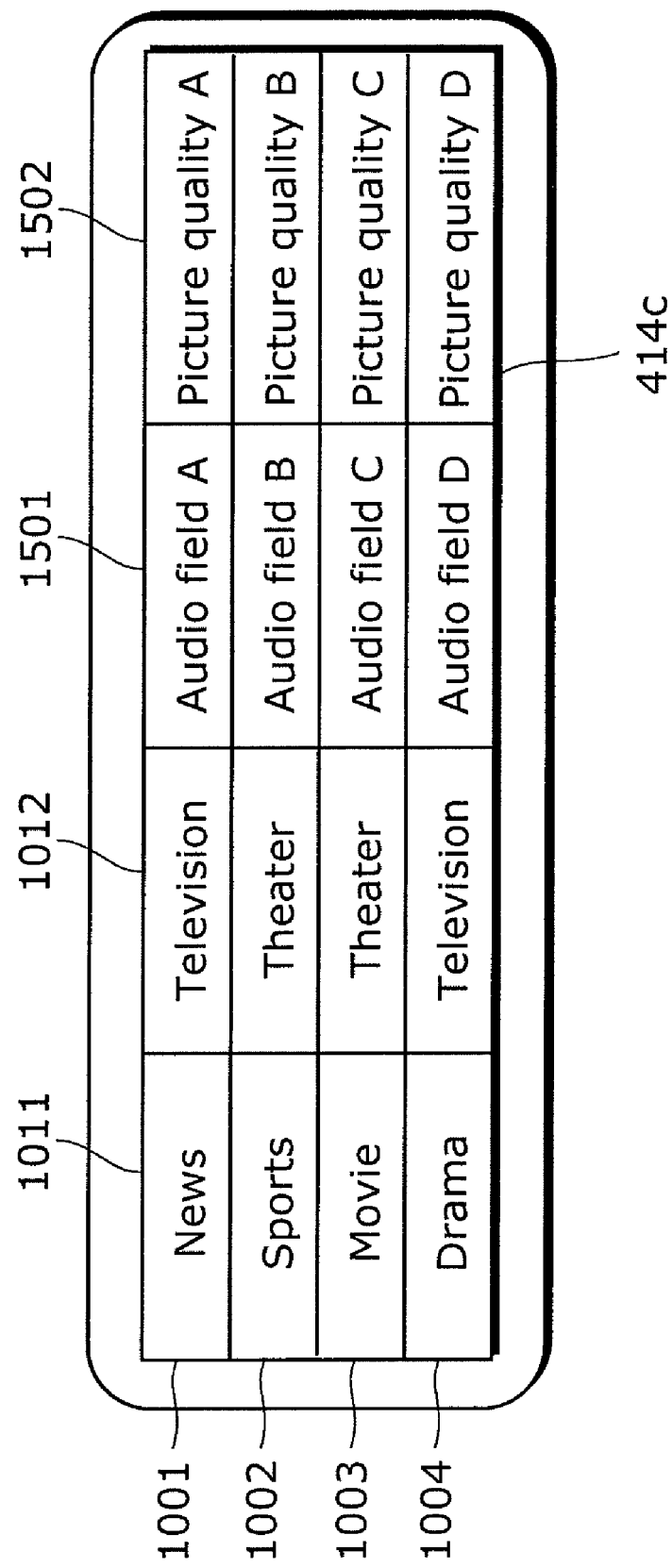
FIG. 17 is a diagram showing an example of a mode correspondence table according to a third modification of the embodiment of the present invention.

FIG. 17 is a diagram showing an example of the mode correspondence table stored in the correspondence table storage unit 414 in the present modification.

A mode correspondence table 414c shown in FIG. 17 has columns 1501 and 1502 which are not included in the mode correspondence table 414a in the previously described embodiment described in FIG. 11. The column 1501 indicates the acoustic field mode corresponding to the genre information stored in column 1011. For example, any one of "acoustic field A", "acoustic field B", "acoustic field C", and "acoustic field D" is set as the acoustic field mode. The column 1502 indicates the picture quality mode corresponding to the genre information stored in column 1011. For example, any one of "picture quality A", "picture quality B", "picture quality C", and "picture quality D" is set as the picture quality mode. This means that, in the mode correspondence table 414c, the audio output mode, the acoustic field mode, and the picture quality mode stored respectively in column 1012, column 1501, and column 1502, are suited for viewing the respective program genres.

Such mode correspondence table 414c is created to include predetermined details as initial values and stored in the correspondence table storage unit 414 beforehand. Furthermore, the STB 4 may be configured so as to allow the details of the mode correspondence table 414c to be changed to desired details through the user's operation of the STB 4. In addition, the STB 4 may be configured so as to allow the details of the mode correspondence table 414c to be updated using data, and the like, that is multiplexed into a broadcast signal. Since the method for such changing and updating can be easily implemented through conventional techniques, detailed explanation shall be omitted.

Figure 18:
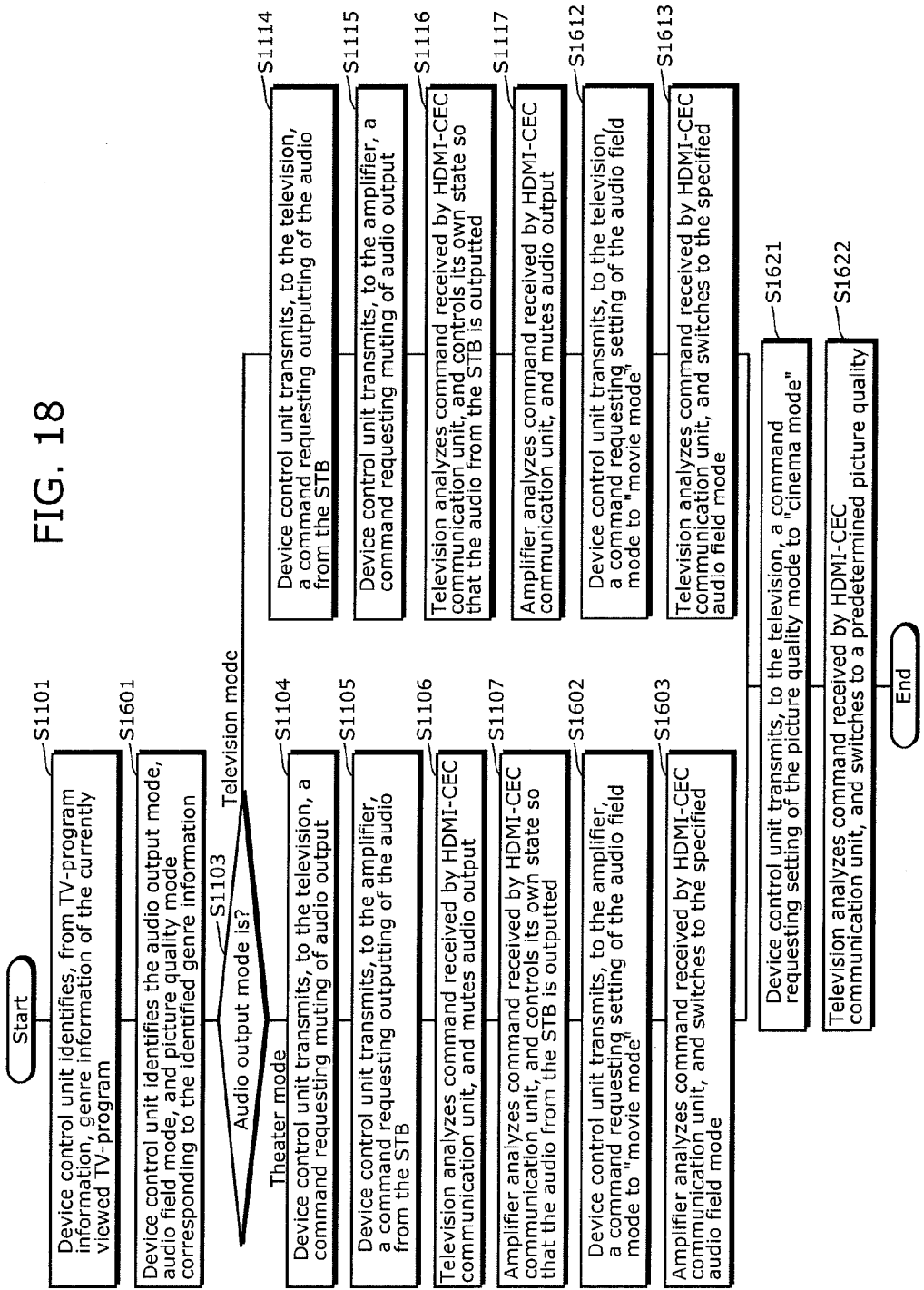
FIG. 18 is a flowchart showing the operation of a home theater system according to the third modification of the embodiment of the present invention.

Next, the flow of the process in the present modification shall be described using FIG. 18.

FIG. 18 is a flowchart showing the operation of the home theater system in the present modification. Note that the same numerical reference is affixed to a process that is the same as the process in the previously described embodiment described in FIG. 12, and duplicate explanation shall be omitted.

First, the device control unit 413 extracts genre information from the TV-information of a received TV-program. For example, the attribute obtainment unit 413a of the device control unit 413 extracts the genre information included in the TV-information of the received TV-program, from among the TV-program information display data indicated in FIG. 8. For example, in the case where the channel identifier of the TV-program reproduced at a time 11 o'clock is "1", the attribute obtainment unit 413a of the device control unit 413 extracts "movie" as the genre information (step S1101).

When the genre information is extracted in step S1101, the mode identification unit 413b of the device control unit 413 refers to the mode correspondence table 414c described in FIG. 17, and identifies whether the audio output mode corresponding to the extracted genre information is the "television mode" or the "theater mode". In addition, the mode identification unit 413b of the device control unit 413 identifies the acoustic field mode and the picture quality mode corresponding to the genre information. For example, when the genre information extracted in step S1101 is "movie", the mode identification unit 413b of the device control unit 413 refers to the mode correspondence table 414c described in FIG. 17, and identifies the "theater mode" as the audio output mode, identifies the "acoustic field C" as the acoustic field mode, and identifies the "picture quality C" as the picture quality, corresponding to "movie". Furthermore, when the genre information extracted in step S1101 is "news", the mode identification unit 413b of the device control unit 413 identifies the "television mode" as the audio output mode, identifies the "acoustic field A" as the acoustic field mode, and identifies the "picture quality A" as the picture quality (step S1601).

From here on, the device control unit 413 performs the same operation as in the previously described embodiment, as well as steps S1602, step S1612, and step S1621, according to whether the audio output mode obtained in step S1601 is the "theater mode" or the "television mode". In other words, in the home theater system in the present modification, after step s1601, the operations of steps S1103 to S1117 of the previously described embodiment, together with step 1602, step 1603, step 1612, step 1613, step 1621 and step 1622 are performed In the case where the audio output mode is judged to be the "theater mode" in step S1103, the linkage execution unit 413c of the device control unit 413 transmits, to the amplifier 2, an HDMI-CEC command instructing the setting of the acoustic field mode to the acoustic field mode (for example, movie mode) identified in step S1601 (step S1602). Next, upon receiving the HDMI-CEC command, the HDMI-CEC communication unit 303 of the amplifier 2 outputs the received command to the microcomputer 302. The microcomputer 302 of the amplifier 2 analyzes the command, and controls the acoustic field of the audio signal outputted from the speaker output unit 306, according to the command (step S1603). With this, the acoustic field mode can be switched.

On the other hand, in the case where the audio output mode is judged to be the "television mode" in step S1103, the linkage execution unit 413c of the device control unit 413 transmits, to the television 1, an HDMI-CEC command instructing the setting of the acoustic field mode to the acoustic field mode (for example, movie mode) identified in step S1601 (step S1612). Next, upon receiving the HDMI-CEC command, the HDMI-CEC communication unit 204 of the television 1 outputs the received command to the microcomputer 203. The microcomputer 203 of the television 1 analyzes the command, and controls the acoustic field of the audio outputted from the speaker 208, according to the command (step S1613). With this, the acoustic field mode can be switched.

In addition, regardless of the audio output mode judged in step S1103, the linkage execution unit 413c of the device control unit 413 transmits, to the television 1, an HDMI-CEC command instructing the setting of the picture quality mode to the picture quality mode (for example, cinema mode) identified in step S1601 (step S1621). Next, upon receiving the HDMI-CEC command, the HDMI-CEC communication unit 204 of the television 1 outputs the received command to the microcomputer 203. The microcomputer 203 of the television 1 analyzes the command, and adjusts the picture quality of the video displayed on the display 207, according to the command (step S1622). With this, the picture quality mode can be switched.

Note that the order of the process described in FIG. 18 is merely an example, and it goes without saying that the process order may be different as long as a substantially equivalent operation is performed.

According to the above-described processes, with the device linkage apparatus 100 in the present modification, the switching between outputting audio from the speaker 208 of the television 1 or outputting audio from the speaker 3 connected to the amplifier 2 can be performed automatically according to the mode correspondence table 414c and in conformance to the genre information received by the STB 4, without requiring the user's operation each time. In addition, with the device linkage apparatus 100 in the present modification it is possible to automatically adjust the picture quality and acoustic field of a TV-program to the optimal picture quality and acoustic field according to the genre of the TV-program. As a result, it is possible to easily view movies, and the like, with picture quality and audio having realistic sensation without having to individually perform the troublesome setting for each of the television 1 and the amplifier 2.

Note that although, in the mode correspondence table 414c in the present modification, the genre information, the audio output mode, the picture quality mode, and the acoustic field mode are associated with each other for each genre information, the channel identifier, the audio output mode, the picture quality mode, and the acoustic field mode may be associated with each other for each channel identifier, in the same manner as in the first modification. Furthermore, it is also possible not to include the mode correspondence table 414c and, in the same manner as in the second modification, the audio output mode, the picture quality mode, and the acoustic field mode may be included in each TV-program information of the TV-program information display data (EPG data).

(Fourth Modification)

Next, a fourth modification in the embodiment of the present invention shall be described.

Although, in the previously described embodiment, the audio output from the speaker 3 connected to the amplifier 2 is controlled without turning the power source of the amplifier 2 ON/OFF, in the present modification, the audio output from the speaker 3 connected to the amplifier 2 is controlled by turning the power source of the amplifier 2 ON/OFF. In other words, the device linkage apparatus 100 in the present modification turns OFF the power source of the amplifier 2 when audio is not to be outputted from the speaker 3 connected to the amplifier 3.

Figure 19:
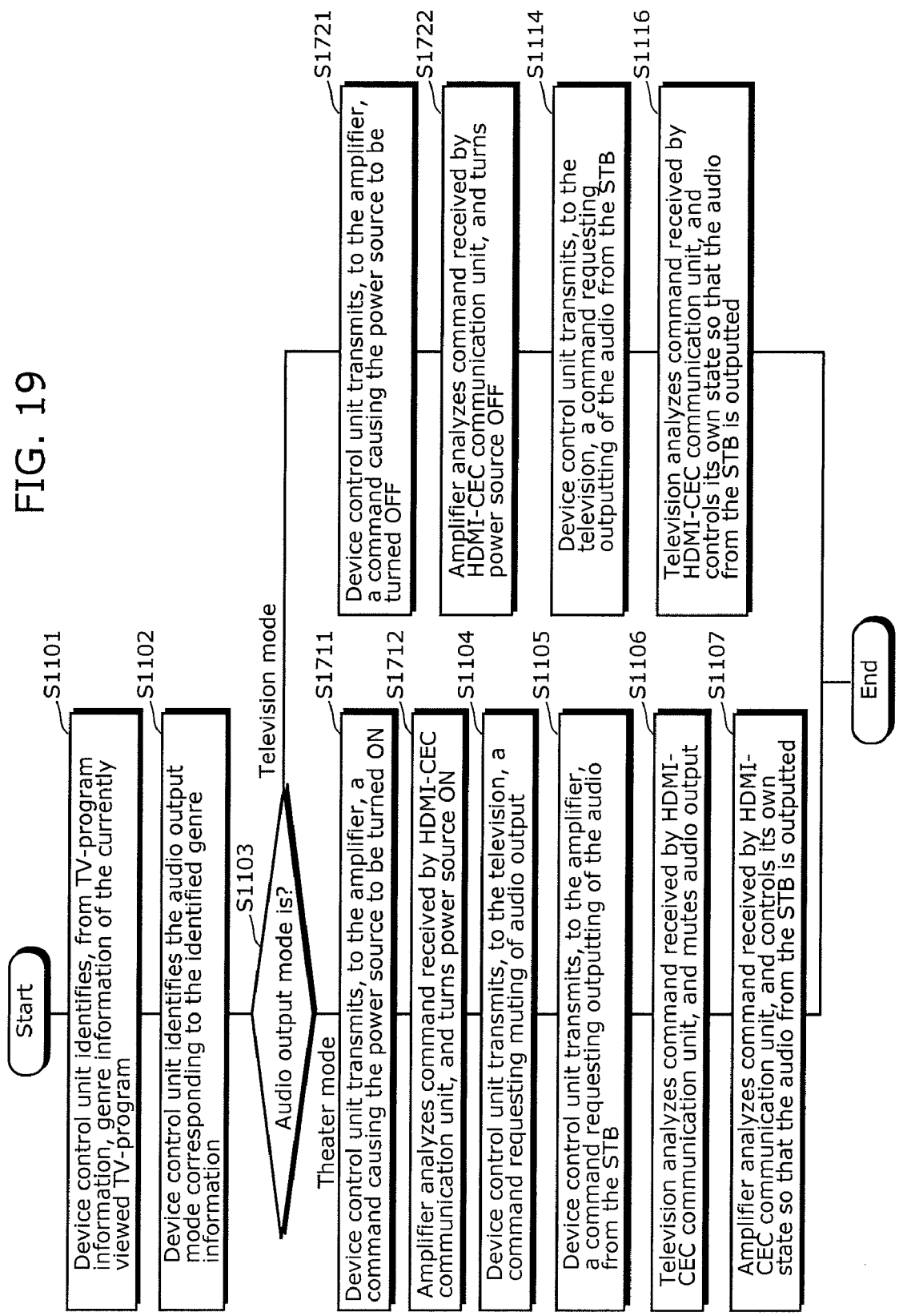
FIG. 19 is a flowchart showing the operation of a home theater system according to a fourth modification of the embodiment of the present invention.

FIG. 19 is a flowchart showing the operation of the home theater system in the present modification. Note that the same numerical reference is affixed to a process that is the same as the process in the previously described embodiment described in FIG. 12, and duplicate explanation shall be omitted. In other words, in the home theater system in the present modification, aside from the processes of step S1711, step S1712, step S1721, and step S1722 shown in FIG. 15, the same processes as the processes described in FIG. 12 are performed.

Upon judging that the audio output mode is the theater mode in step S1103 (theater mode in step S1103), the linkage execution unit 413c of the device control unit 413 transmits, to the amplifier 2 via the HDMI-CEC communication unit 410, an HDMI-CEC command requesting the turning ON of the power source of the amplifier 2 (step S1711).

When the HDMI-CEC requesting the turning ON of the power source of the amplifier 2 is transmitted from the HDMI-CEC communication unit 410 of the STB 4 in step S1711, the HDMI-CEC communication unit 303 of the amplifier 2 receives such transmitted command and outputs the received command to the microcomputer 302. The microcomputer 302 of the amplifier 2 analyzes the command, and turns ON the power source of the whole of the amplifier 2 (step S1712). Note that the microcomputer 302 does not do anything when the power source is already ON. In addition, by performing the processes in steps S1104 to S1107 described in FIG. 12, the home theater system causes the audio to be outputted from the speaker 3 connected to the amplifier 2, and causes the audio output from the television 1 to be muted.

On the other hand, upon judging that the audio output mode is the television mode in step S1103 (television mode in step S1103), the linkage execution unit 413c of the device control unit 413 transmits, to the amplifier 2 via the HDMI-CEC communication unit 410, an HDMI-CEC command requesting the turning OFF of the power source of the amplifier 2.

When the HDMI-CEC requesting the turning OFF of the power source of the amplifier 2 is transmitted from the HDMI-CEC communication unit 410 of the STB 4 in step S1721, the HDMI-CEC communication unit 303 of the amplifier 2 receives such transmitted command and outputs the received command to the microcomputer 302. The microcomputer 302 of the amplifier 2 analyzes the command, and turns OFF the power source of the amplifier 2, except for the microcomputer 302 (step S1722). Note that the microcomputer 302 does not do anything when the power source is already OFF. In addition, by performing the processes in step S1114 and step S1116 described in FIG. 12, the home theater system causes the audio output from the speaker 3 connected to the amplifier 2 to be terminated, and causes audio to be outputted from the television 1 instead.

With the processes described above, the device linkage apparatus 100 in the present modification operates in such a way that, in the case where a broadcast TV-program is a TV-program in mono audio, the power source of the amplifier 2 is automatically turned OFF when it is judged that the audio signal is not to be outputted from the speaker output unit 306 of the amplifier 2, based on a predetermined condition. As a result, in the present modification, when there is no need to use the amplifier 2 to output audio, it is possible to eliminate the troublesome operation in which the user has to go through the trouble of operating the amplifier 2 in order to turn OFF the power source of the amplifier 2. In addition, in the present modification, it is possible to reduce unnecessary power consumption when the user forgets to turn OFF the power source of the amplifier 2. In other words, with the device linkage apparatus 100 in the present modification, convenience can be improved.

Although the device linkage apparatus according to the present invention has been described thus far using the embodiment and the modifications, the present invention is not limited to such embodiment and modifications.

For example the device linkage apparatus 100 may let the user select either of the television mode or the theater mode. In other words, when switching between the television mode and theater mode occurs frequently when the user changes the channel of the STB 4, there is a possibility of irritating the user. In such a case, the device linkage apparatus lets the user select either the television mode or the theater mode.

More specifically, by causing an HDMI-CEC command to be sent from the HDMI-CEC communication unit 410, the device control unit 413 of the STB 4 judges whether or not both the television 1 and the amplifier 2 for configuring the home theater system are connected to the STB 4. Then, upon judging that both are connected, and identifying the theater mode as the audio output mode suited to a TV-program, the device control unit 413, without immediately switching the audio output mode to the theater mode, causes a message prompting the change to the theater mode to be displayed on the display 207 of the television 1.

Figure 20:
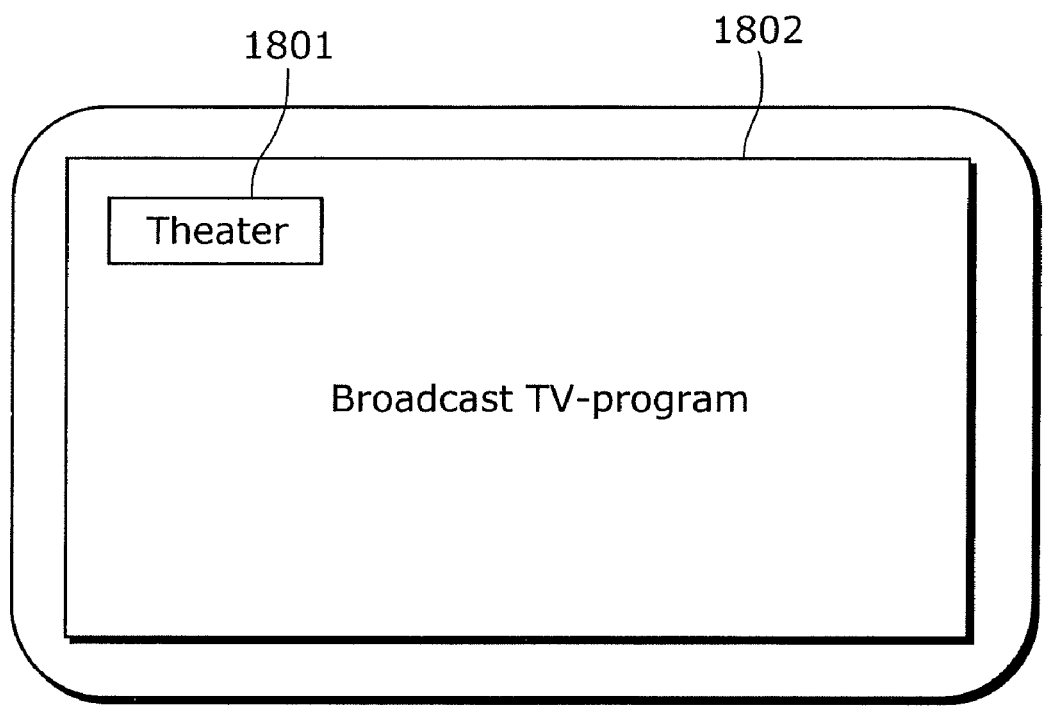
FIG. 20 is a diagram showing an example of a message displayed on a display according to the present invention.

FIG. 20 is a diagram showing the message that is displayed on the display 207.

For example, as shown in FIG. 20, the device control unit 413 causes a message 1801, in which "theater" is written, to be displayed on an area 1802, in the display 207, on which a TV-program is displayed. The message 1802 notifies the viewer that changing to the theater mode is possible. Here, the user can set the audio output mode to the theater mode by pressing the theater mode button 508 of the operating panel 500 in the STB remote control. Note that the theater button 508 can also be implemented as a graphical user interface on the display 207.

Furthermore, the device linkage apparatus 100 may let the user select the audio to be outputted from the speaker 3 from any one of mono audio, stereo audio, and 5.1 channel audio. In this case, the device linkage apparatus 100 causes the HDMI-CEC communication unit 410 to output, to the amplifier 2, an HDMI-CEC command requesting the output of the selected audio. Then, the amplifier 2 causes the speaker 3 to output the audio indicated in the command. With this, even a TV-program whose audio is to be outputted in 5.1 channel audio can be viewed by the user in mono audio or stereo audio, according to the user's own preference, thus further improving usability.

Furthermore, although the television includes a tuner 205 and a decoder 206 in the embodiment and the modifications, these constituent elements need not be included.

Furthermore, although the STB 4 receives broadcast data of CATV or digital broadcasts in the embodiment and the modifications, the television 1 may receive the broadcast data in place of the STB 4. In this case, the device linkage apparatus 100 configured of the device control unit 413 and the correspondence table storage unit 414 is included in the television 1. In addition, the device linkage apparatus 100 included in the television 1 analyzes the genre information and channel identifier, and changes the audio output mode, the picture quality, and the acoustic field.

Furthermore, although the STB 4 receives broadcast data of CATV or digital broadcasts in the embodiment and the modifications, in addition, the broadcast TV-program may be recorded on a hard disk, a Digital Versatile Disk (DVD), and the like.

Furthermore, although in the embodiment and the modifications, the device linkage apparatus 100 implements the changing to the audio output mode conforming to the genre information or channel identifier of the broadcasted TV-program, changing of the audio output mode, the picture quality, and acoustic field may be implemented using the genre information, the channel identifier, and other attributes and the like, recorded on a hard disk or DVD and the like.

Furthermore, although in the embodiment and the modifications, the device linkage apparatus 100 transmits an HDMI-CEC command requesting the changing to the audio output mode corresponding to the genre information or channel identifier, regardless of the current setting of the audio output mode, it is also possible that the current audio output mode is checked and the command transmitted only when changing is required. In other words, upon extracting the genre information or channel identifier, the device linkage apparatus 100 first performs the transmission and reception of an HDMI-CEC command for checking the current audio output mode and, as a result, transmits an HDMI-CEC command requesting the changing to the audio output mode corresponding to the genre information or channel identifier only in the case where changing from the current setting is required.

Furthermore, although the device linkage apparatus 100 transmits an HDMI-CEC command requesting the changing of the audio output mode but does not carry out re-transmission in the embodiment and the modifications, the command may be re-transmitted. In other words, upon receiving an HDMI-CEC command, the amplifier 2 and the television 1 transmits, to the device linkage apparatus 100, a command notifying the reception of the HDMI-CEC command, and a command notifying the changing of the audio output mode. Subsequently, when the device linkage apparatus 100 does not receive the command notifying the changing, within a predetermined time, or receives a command notifying that changing was not successful, the device linkage apparatus 100 transmits the HDMI-CEC command again.

Furthermore, although the EPG control unit 412 and the device control unit 413 are configured as dedicated hardware in the embodiment and the modifications, the EPG control unit 412 and the device control unit 413 may be configured as a program stored in the second memory 403 and executed by a Central Processing Unit (CPU) of the microcomputer 411 and the like.

Furthermore, the device linkage apparatus 100 in the embodiment and the modifications, that is, the device control unit 413 and the correspondence table storage unit 414, may be configured through a semiconductor integrated circuit such as a Large Scale Integration (LSI).

Aside from these, various modifications are possible as long as they do not depart from the scope of the present invention.

INDUSTRIAL APPLICABILITY

The device linkage apparatus in the present invention produces the effect of being able to reduce the operating load of the user and cause devices to be linked appropriately, and can be applied in: a broadcast receiver such as an STB; a mobile phone, a mobile terminal, and an in-vehicle terminal that can receive a broadcast; a personal computer which receives audio and video data via the Internet, and so on.

The invention claimed is:

1. A device linkage apparatus which causes operations of devices used in reproducing an audio and video content to be linked with each other, said device linkage apparatus comprising:

a correspondence table storage unit in which a mode correspondence table is stored, the mode correspondence table indicating, for each attribute of an audio and video content, a mode corresponding to the attribute;

an attribute obtainment unit operable to obtain an attribute of an audio and video content to be reproduced;
a mode identification unit operable to identify, from among the modes indicated in the mode correspondence table, a mode corresponding to the attribute obtained by said attribute obtainment unit;
a mode acceptance unit operable to accept a mode according to an operation by a user;
a linkage execution unit operable to cause the operations of the devices to be linked according to the mode identified by said mode identification unit and the mode accepted by said mode acceptance unit, and to cause the devices to reproduce the audio and video content to be reproduced, by transmitting a High Definition Multimedia Interface (HDMI)-Consumer Electronics Control (CEC)-based command to the devices; and
a checking unit operable to check: a power source state set for each of the devices; a mode in which each of the devices is currently operating; and a fact that the devices have received the command transmitted by said linkage execution unit,
wherein said linkage execution unit is operable to:
turn ON the power source of a device by transmitting the command to the device, upon judging, based on the check by said checking unit, that the power source of the device is OFF;
prohibit the transmission of the command, upon judging, based on the check by said checking unit, that the respective modes in which the devices are currently operating match the mode identified by said mode identification unit or the mode accepted by said mode acceptance unit; and
transmit the command again to a device, upon judging that said checking unit is unable to check, within a predetermined period, the fact that the device has received the command,
wherein the devices each include a first device and a second device which output audio, and
wherein said linkage execution unit is operable to:
cause operations of the first device and the second device to be linked so that the second device suppresses audio output and the first device outputs audio, when said mode identification unit identifies a first mode; and
cause operations of the first device and the second device to be linked so that the first device suppresses audio output and the second device outputs audio, when said mode identification unit identifies a second mode.

2. The device linkage apparatus according to claim 1,
wherein the first device outputs video and audio of the content, and
wherein said linkage execution unit is operable to:
cause operations of the first device and the second device to be linked so that the second device suppresses audio output and the first device outputs video and audio, when said mode identification unit identifies the first mode; and
cause operations of the first device and the second device to be linked so that the first device suppresses audio output and outputs video and the second device outputs audio, when said mode identification unit identifies the second mode.

3. The device linkage apparatus according to claim 2,
wherein said linkage execution unit is operable to cause the operation of the devices to be linked with each other so as to adjust audio quality of the audio to be outputted by the devices.

4. The device linkage apparatus according to claim 3,
wherein said linkage execution unit is further operable to adjust picture quality of the video to be outputted by the first device, according to the mode identified by said mode identification unit.

\* \* \* \* \*